US012811741B2

(12) United States Patent
Chen et al.

(10) Patent No.: US 12,811,741 B2
(45) Date of Patent: Nov. 24, 2026

(54) UPLINK CANCELLATION INDICATION FOR SRS MUTING

(71) Applicant: QUALCOMM Incorporated, San Diego, CA (US)

(72) Inventors: Yitao Chen, San Diego, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 588 days.

(21) Appl. No.: 18/453,215

(22) Filed: Aug. 21, 2023

(65) Prior Publication Data

US 2024/0113835 A1 Apr. 4, 2024

Related U.S. Application Data

(60) Provisional application No. 63/377,718, filed on Sep. 29, 2022.

(51) Int. Cl.
*H04L 5/00* (2006.01)

(52) U.S. Cl.
CPC .................................. *H04L 5/0051* (2013.01)

(58) Field of Classification Search
CPC ... H04L 5/0044; H04L 5/0048; H04L 5/0094; H04L 5/0096; H04W 16/14; H04W 72/1268; H04W 72/50
See application file for complete search history.

(56) References Cited

U.S. PATENT DOCUMENTS

| | | | | |
|---|---|---|---|---|
| 2020/0344747 | A1* | 10/2020 | Park | H04W 72/21 |
| 2022/0353887 | A1* | 11/2022 | Xu | H04L 1/0068 |
| 2023/0014045 | A1* | 1/2023 | Jiao | H04W 72/0446 |
| 2023/0309090 | A1* | 9/2023 | Bae | H04L 1/1822 |
| 2023/0337229 | A1* | 10/2023 | Cui | H04B 7/0602 |
| 2023/0345419 | A1* | 10/2023 | Takeda | H04L 5/0094 |
| 2024/0089956 | A1* | 3/2024 | Bae | H04L 5/0044 |
| 2025/0365694 | A1* | 11/2025 | Li | H04W 64/00 |

* cited by examiner

*Primary Examiner* — Romani Ohri
(74) *Attorney, Agent, or Firm* — QUALCOMM Incorporated

(57) ABSTRACT

A user equipment (UE) receives a configuration for a sounding reference signal (SRS) and receives an uplink cancellation indication configuration. The UE receives a cancellation indication canceling at least a portion of the SRS including one or more of: time resources extending over one or more slots, a subset of resource elements within a resource block, or at least one code domain parameter of the SRS. The UE cancels one or more SRS transmissions based on the cancellation indication.

30 Claims, 23 Drawing Sheets

450

400

1200

```
CI-ConfigurationPerServingCell-r16          ::=          SEQUENCE  {
        servingCellId                                        ServCellIndex,
        positionInDCI-r16                                    INTEGER     (0..maxCI-DCI-PayloadSize-1-r16),
        positionInDCI-ForSUL-r16                             INTEGER     (0..maxCI-DCI-PayloadSize-1-r16)
OPTIONAL, -- Cond SUL-Only
        ci-PayloadSize-r16                                   ENUMERATED {n1, n2, n4, n5, n7, n8, n10, n14, n16,
N20, n28, n32, n35, n42, n56, n112},
        timeFrequencyRegion-r16                              SEQUENCE {
                timedurationForCI-r16                                ENUMERATED {n2, n4, n7, n14, n28, n42, n56, ...}
OPTIONAL, -- Cond SymbolPeriodicity
        timeGranularityForCI-r16                             ENUMERATED {n1, n2, n4, n7, n14, n28},
        frequencyRegionForCI-r16                             INTEGER (0..37949),
        combSpacingForCI-r18                                 INTEGER (2, 4, 8),
        combOffsetforCI-r18                                  INTEGER (0.. combSpacingForCI-r18 -1),
        deltaOffset-r16                                      INTEGER (0..2),
        ...
        },
        cyclicShiftsForCI-r18                                SEQUENCE {SIZE(1.. cyclicShift)}
        uplinkCancellationPriority-v1610                     ENUMERATED {enabled}
OPTIONAL  -- Need S
}
```

FIG. 12

UPLINK CANCELLATION INDICATION FOR SRS MUTING

CROSS REFERENCE TO RELATED APPLICATION(S)

This application claims the benefit of and priority to U.S. Provisional Application Ser. No. 63/377,718, entitled "Uplink Cancellation Indication for SRS Muting" and filed on Sep. 29, 2022, which is expressly incorporated by reference herein in its entirety.

TECHNICAL FIELD

The present disclosure relates generally to communication systems, and more particularly, to a reference signal configuration for wireless communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at a user equipment (UE). The apparatus may be configured to receive a configuration for a sounding reference signal (SRS), receive an uplink cancellation indication configuration, and receive a cancellation indication canceling at least a portion of the SRS including one or more of time resources extending over one or more slots, a subset of resource elements within a resource block, or at least one code domain parameter of the SRS.

In an aspect of the disclosure, a method, a computer-readable medium, and an apparatus are provided for wireless communication at a UE. The apparatus may be configured to receive a configuration for a SRS, receive an uplink cancellation indication configuration, receive a cancellation indication indicating a periodicity for canceling the SRS, and skip transmission of the SRS based on the periodicity indicated in the cancellation indication.

In an aspect of the disclosure, a method, a computer-readable medium, and an apparatus are provided for wireless communication at a network node. The apparatus may be configured to configure a UE for a SRS, configure an uplink cancellation indication configuration for the UE. The apparatus may further be configured to provide a cancellation indication canceling at least a portion of the SRS including one or more of time resources extending over one or more slots, a subset of resource elements within a resource block, or at least one code domain parameter of the SRS.

In an aspect of the disclosure, a method, a computer-readable medium, and an apparatus are provided for wireless communication at a network node. The apparatus may be configured to provide a configuration to a UE for a SRS, configure an uplink cancellation indication configuration for the UE, provide a cancellation indication indicating a periodicity for canceling the SRS, and skip reception of the SRS based on the periodicity indicated in the cancellation indication.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 12 illustrates example aspects of an RRC configuration for a ULCI.

DETAILED DESCRIPTION

Figure 1:
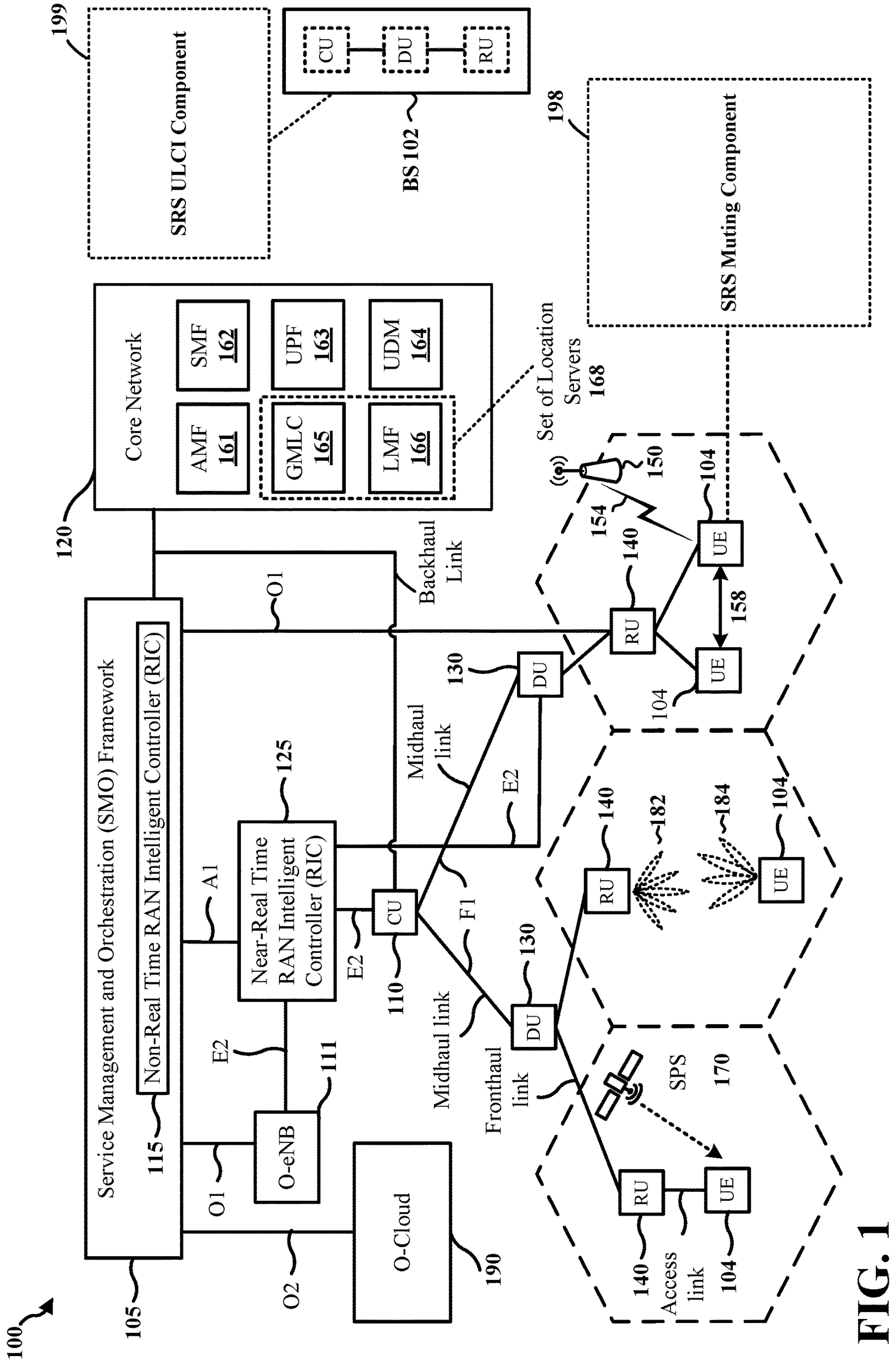
FIG. 1 is a diagram illustrating an example of a wireless communications system and an access network.

A UE may be configured to transmit a SRS. The SRS transmissions enable the network to measure the received signal and estimate an uplink channel quality over a bandwidth and/or beam for communication with the UE. The base station may use the measurements of the SRS to adjust one or more parameters of communication with the UE. As multiple transmission reception points (TRPs) may receive SRS transmissions from an individual UE, and a communication system may include multiple UEs for which the network obtains SRS measurements, multiple UEs may transmit SRS on the same time and/or frequency resources. The overlapping SRS transmissions may cause interference. In order to mitigate or reduce interference, SRS transmissions may be muted on a transmission occasion, e.g., in a symbol, for some UEs. Aspects presented herein provide for SRS muting that allows for the cancellation of more than one transmission occasion. Aspects presented herein provide for an uplink cancellation indication (ULCI) that cancels SRS over a time domain, a frequency domain, and/or a code domain. Accordingly, the ULCI canceling the SRS over a time domain may reduce signaling overhead compared to a ULCI canceling individual SRS instances.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 may include an SRS muting component 198 configured to receive a configuration for an SRS, receive an uplink cancellation indication configuration, and receive a cancellation indication canceling at least a portion of the SRS including one or more of: time resources extending over one or more slots, a subset of resource elements within a resource block, or at least one code domain parameter of the SRS. In some aspects, the SRS muting component 198 may be configured to receive a configuration for an SRS, receive an uplink cancellation indication configuration, receive a cancellation indication indicating a periodicity for canceling the SRS, and skip transmission of the SRS based on the periodicity indicated in the cancellation indication. In some aspects, the base station 102 may include an SRS ULCI component 199 configured to configure a UE 104 for an SRS; configure an uplink cancellation indication configuration for the UE; provide a cancellation indication canceling at least a portion of the SRS including one or more of: time resources extending over one or more slots, a subset of resource elements within a resource block, or at least one code domain parameter of the SRS. In some aspects, the SRS ULCI component 199 may be configured to provide a configuration to a UE 104 for an SRS; configure an uplink cancellation indication configuration for the UE 104; provide a cancellation indication indicating a periodicity for canceling the SRS; and skip reception of the SRS based on the periodicity indicated in the cancellation indication. Although the following description may be focused on 5G NR, the concepts described herein may be applicable to other similar areas, such as LTE, LTE-A, CDMA, GSM, and other wireless technologies.

Figure 2A:
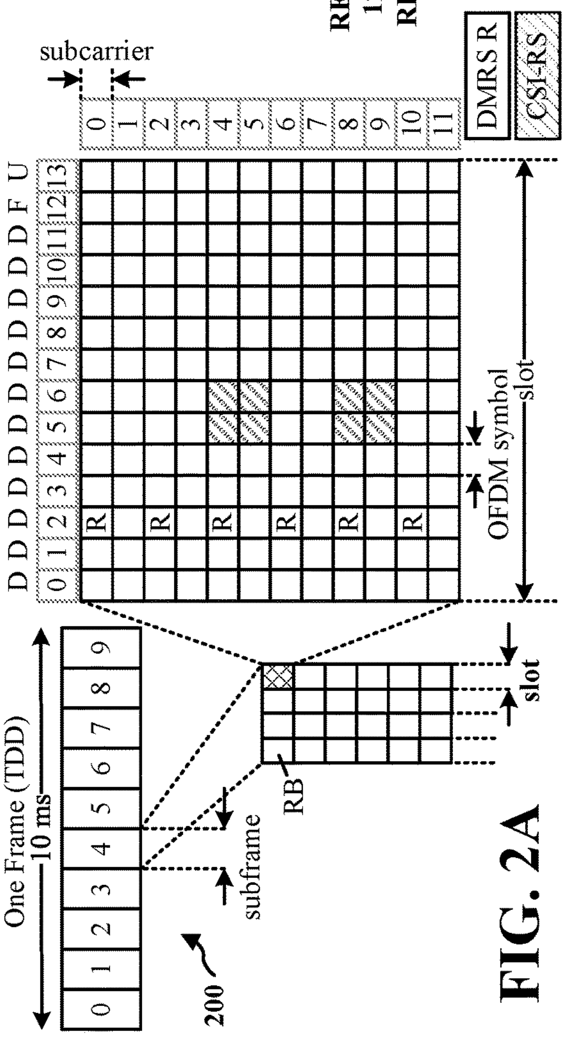
FIG. 2A is a diagram illustrating an example of a first frame, in accordance with various aspects of the present disclosure.
Figure 2B:
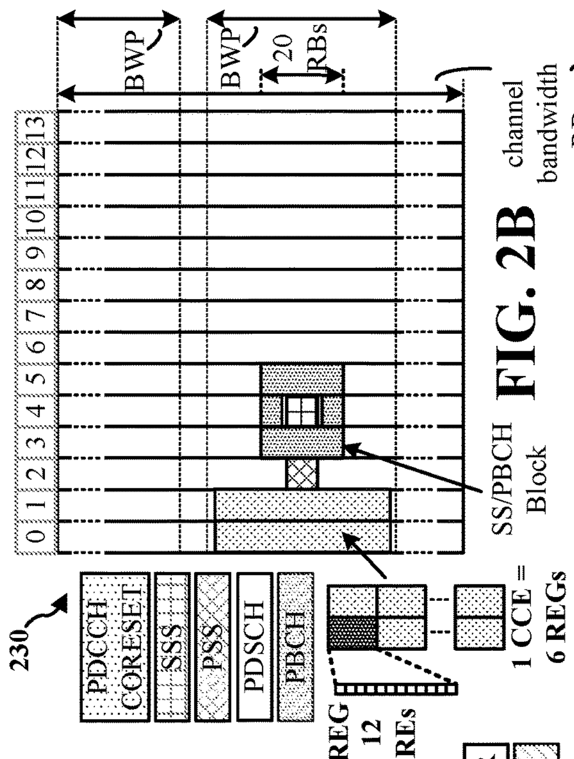
FIG. 2B is a diagram illustrating an example of downlink (DL) channels within a subframe, in accordance with various aspects of the present disclosure.
Figure 2C:
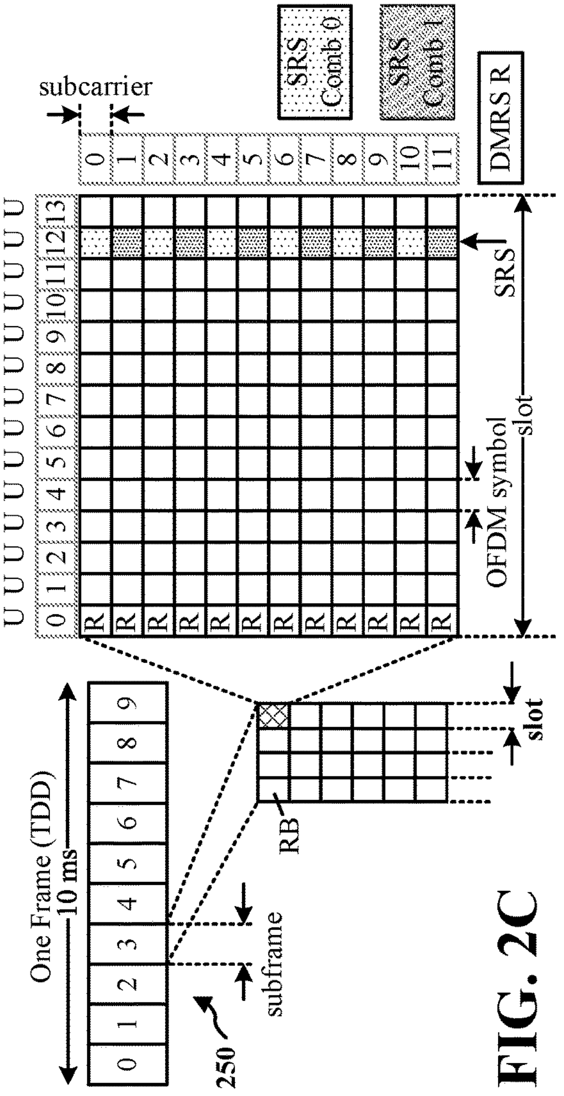
FIG. 2C is a diagram illustrating an example of a second frame, in accordance with various aspects of the present disclosure.
Figure 2D:
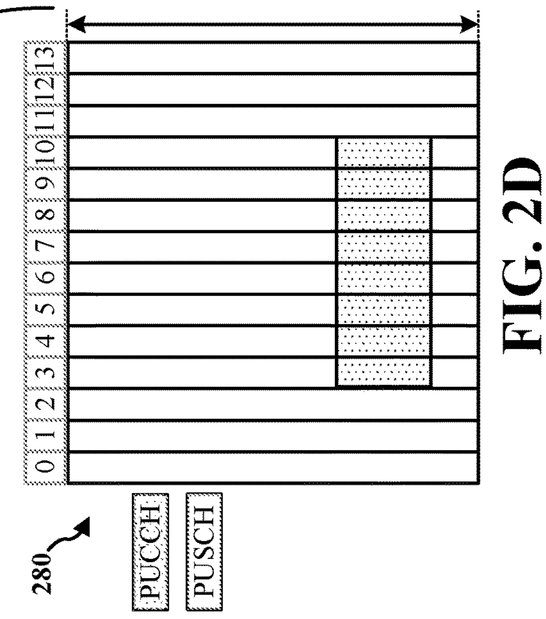
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit SRS. The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
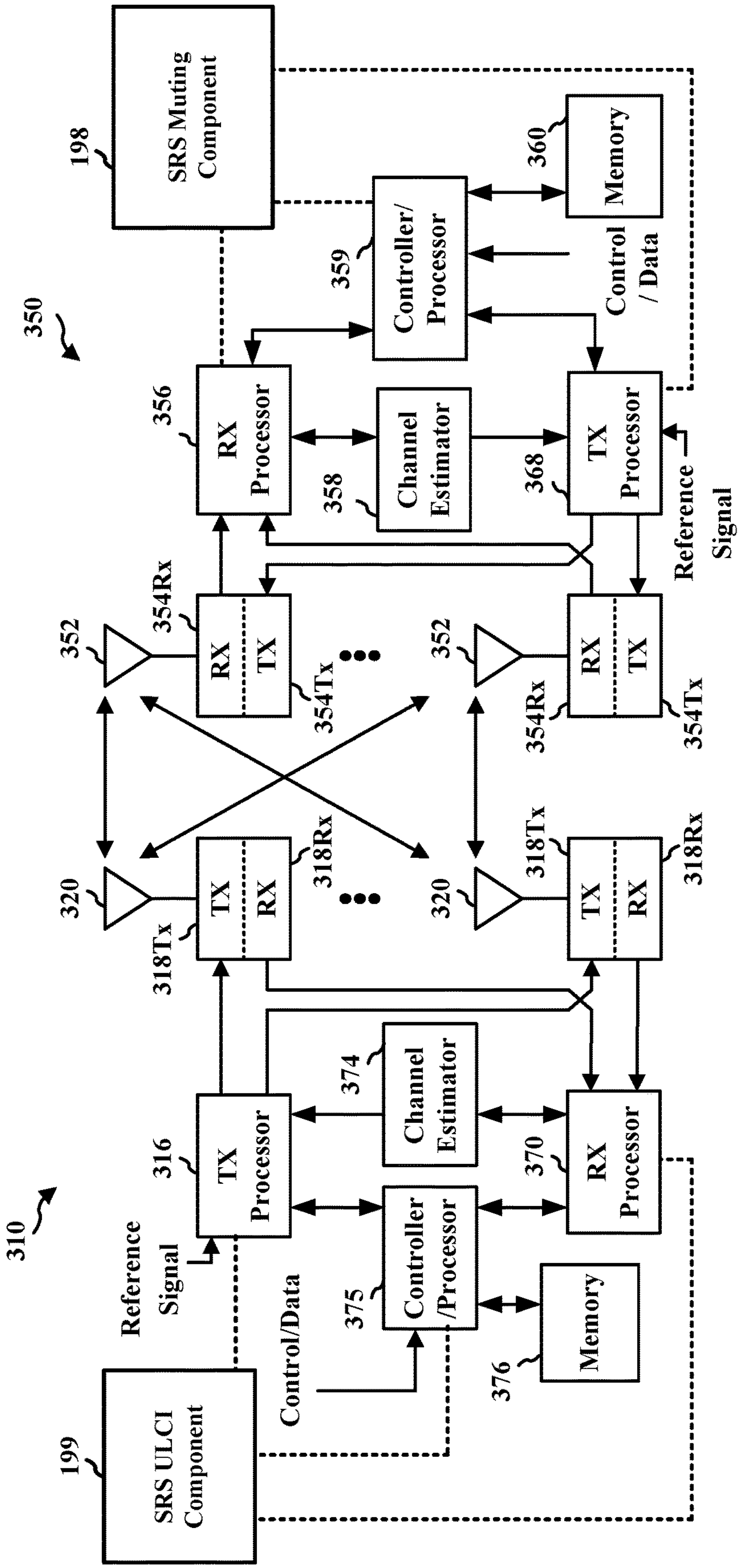
FIG. 3 is a diagram illustrating an example of a base station and UE in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360, e.g., which may be referred to as one or more memories, that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the SRS muting component 198 of FIG. 1.

At least one of the TX processor 316, the RX processor 370, and the controller/processor 375 may be configured to perform aspects in connection with the SRS ULCI component 199 of FIG. 1.

A network node may configure a UE to transmit an SRS to enable the network node to measure the received SRS signal and estimate an uplink channel quality over a bandwidth and/or beam for communication with the UE. The base station may use the measurements of the SRS to adjust one or more parameters of communication with the UE. As multiple transmission reception points (TRPs) may receive SRS transmissions from an individual UE, and a communication system may include multiple UEs for which the network obtains SRS measurements, multiple UEs may transmit SRS on the same time and/or frequency resources.

In some aspect of wireless communication, SRS resources may be configured within an SRS resource set including one or more SRS resources. Such a configuration mechanism, in some aspects, simplifies the activation (for semi-persistent SRS) and DCI triggering (for aperiodic SRS) since multiple resources can be activated/triggered simultaneously. In some aspects, an RRC configuration for each SRS resource set (e.g., a "resourceType") may indicate to the UE that the SRS resource set is aperiodic, semi-persistent, or periodic. The UE may transmit a periodic SRS using periodic resources according to the configuration. The UE may transmit a semi-persistent (SP) SRS during a duration of time, such as when the SPS SRS is activated or otherwise indicated. The UE may transmit an aperiodic SRS in response to an occurrence of a triggering event. In some aspects, the UE may transmit the aperiodic SRS, according to the RRC configuration, in response to reception of a DCI that triggers the SRS transmission.

In some aspects, aperiodic SRS resources may be triggered by reception of a DCI indicating for the UE to transmit the SRS. For example, the aperiodic SRS transmission may be triggered with a DL DCI (e.g., a DCI format 1_1 or DCI format 1_2) or an UL DCI (e.g., a DCI format 0_1 or DCI format 0_2) or group-common DCI (e.g., a DCI format 2_3). In some aspects, an SRS request field of the DCI may indicate one or more SRS resource sets based on a mapping between SRS resource sets and the SRS request codepoints (i.e. 01, 10, 11) provided in an RRC configuration (e.g., via an element such as a "aperiodicSRS-ResourceTrigger" or "aperiodicSRS-ResourceTriggerList"). In some aspects, the aperiodic SRS resource may be a one-time transmission of SRS (e.g., not periodic) based on a slot offset. The slot offset may be RRC configured per SRS resource set or an SRS offset indicator field that may be added to a DCI for more flexible indication of slot offset.

Table 2 illustrates an example of SRS request fields and the relation to a triggered aperiodic SRS resource.

TABLE 2

| Value of SRS request field | Triggered Aperiodic SRS resource set(s) for DCI format 0_1, 0_2, 1_1, 1_2, and 2_3 configured with higher layer parameters srs-TPC-PDCCH-Group set to 'typeB' |
|---|---|
| 00 | No aperiodic SRS resource set triggered |
| 01 | SRS resource set(s) configured with higher layer parameter aperiodicSRS-ResourceTrigger set to 1 or an entry in aperiodicSRS-RsourceTriggerList set to 1 |

TABLE 2-continued

| Value of SRS request field | Triggered Aperiodic SRS resource set(s) for DCI format 0_1, 0_2, 1_1, 1_2, and 2_3 configured with higher layer parameters srs-TPC-PDCCH-Group set to 'typeB' |
|---|---|
| 10 | SRS resource set(s) configured with higher layer parameter aperiodicSRS-ResourceTrigger set to 2 or an entry in aperiodicSRS-RsourceTriggerList set to 2 |
| 11 | SRS resource set(s) configured with higher layer parameter aperiodicSRS-ResourceTrigger set to 3 or an entry in aperiodicSRS-RsourceTriggerList set to 3 |

Figure 4A:
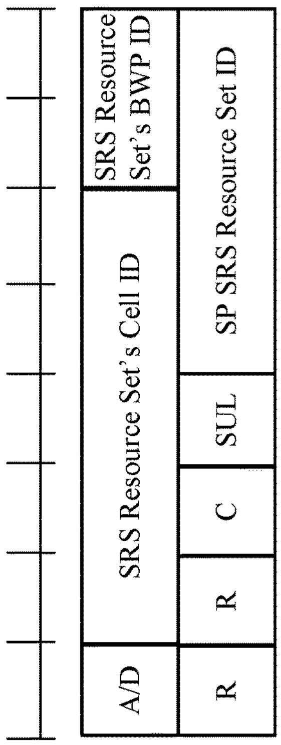
FIG. 4A illustrates example information that may be included in a medium access control-control element (MAC-CE) that activates a semi-persistent SRS.

A semi-persistent SRS resource set may be configured in an RRC configuration, and the UE may start to transmit the SRS using the RRC configured resources once the semi-persistent SRS configuration is activated, e.g., in a MAC-CE. The semi-persistent SRS configuration may be deactivated by a MAC-CE, and the UE may stop the SRS transmission based on the semi-persistent SPS configuration in response to the deactivation. Once activated, the UE may transmit an SRS on the periodic SRS resources within the SRS resource set (e.g., based on periodicity, offset, and/or other parameters RRC configured for the SRS resource set) until another MAC-CE deactivates the resource set. FIG. 4A illustrates an example of MAC-CE contents for a MAC-CE that activates a semi-persistent SRS resource set. As illustrated in FIG. 4A, the MAC-CE 450 may include information, such as an SRS resource set cell identifier (ID), an SRS resource set bandwidth part (BWP) ID, and a semi-persistent SRS resource set ID.

Resources for a periodic SRS may be provided in an RRC configuration, and the UE may transmit the SRS on the configured SRS resources once the RRC configuration is received (e.g., without waiting for an activation such as for the semi-persistent SRS). The UE may transmit the SRS using the SRS resources within the SRS resource set. The RRC configuration may indicate a periodicity of the SRS resources, an offset, among other example parameters for the periodic SRS.

Figure 4B:
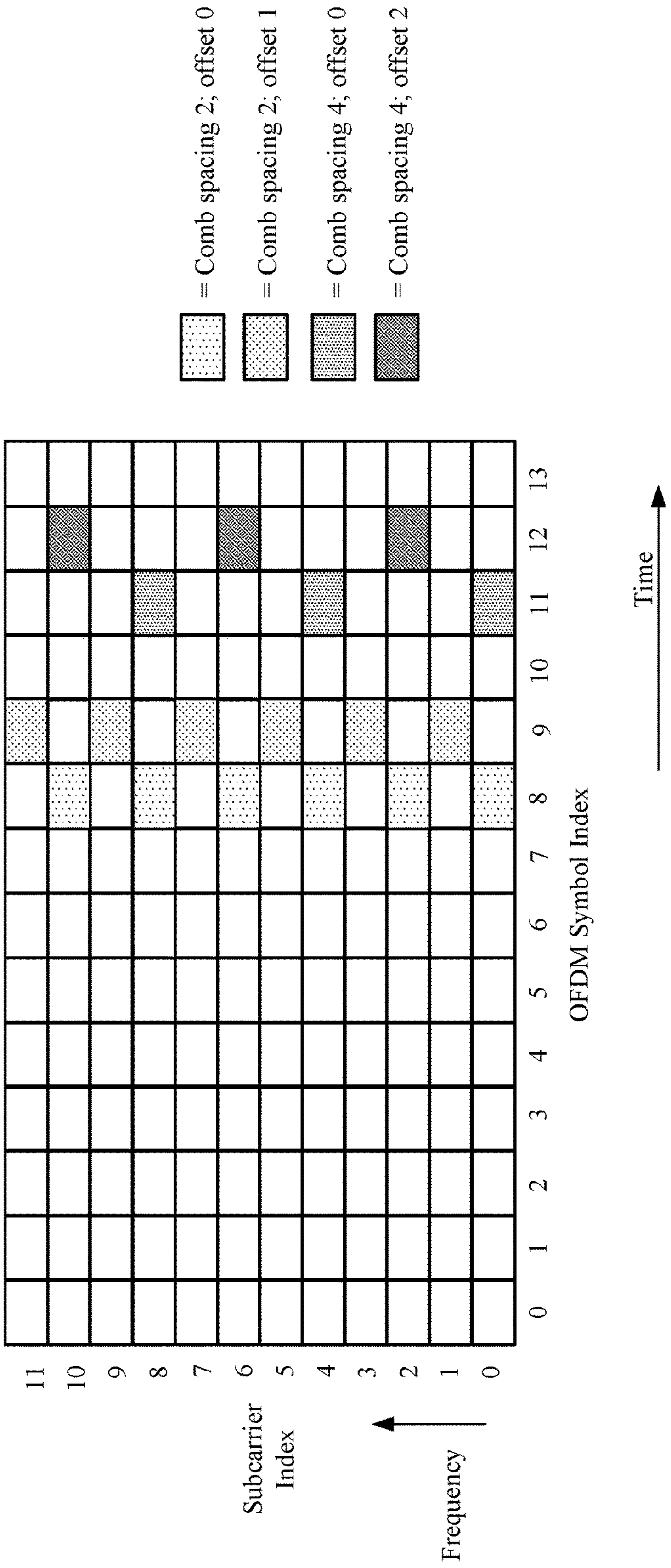
FIG. 4B illustrates a time and frequency resource diagram showing example aspects of SRS transmission.

An SRS resource set may be configured with a comb spacing, and a comb offset. As an example, the comb spacing configured for the SRS may indicate a frequency comb spacing between SRS REs in a symbol. For example, the comb spacing ($K_{TC}$) for the SRS may be configured as 2, 4, or 8 per SRS resource. As an example, a comb spacing of 2 corresponds to a spacing between two SRS REs in an OFDM symbol. A comb spacing of 4 corresponds to a spacing of 4 REs between SRS resources, and a comb spacing of 8 corresponds to 8 REs between SRS resources. FIG. 4B illustrates a resource diagram 400 in time and frequency. In FIG. 4B, the SRS in symbol index 8 and symbol index 9 have a comb spacing of 2, whereas the SRS in symbol indexes 11 and 12 have a comb spacing of 4. The comb offset may be indicative of a location of SRS RE, e.g., relative to a starting RE or reference RE. For example, the comb offset ($\bar{k}_{TC}$) for the SRS may be configured as 0, 1, . . . , $K_{TC}-1$ per SRS resource, which indicates the SRS REs (e.g., by indicating a starting RE, and the SRS transmission may occupy every $K_{TC}$ REs within the sounding BW once starting RE is determined). The diagram 400 in FIG. 4B illustrates example aspects of combinations of comb spacing and comb offset. The SRS in symbol index 8 and 11 have an offset of 0, e.g., and have a starting RE that corresponds to subcarrier index 0, or a reference subcarrier within a bandwidth that the SRS is configured to be transmitted. The SRS in symbol index 9 has a comb offset of 1, e.g., and starts in subcarrier index 1, e.g., with an offset of 1 RE or subcarrier from the reference subcarrier. The SRS in symbol index 12 has an offset of 2, and is offset from subcarrier index 0 by 2 REs. The SRS configuration may indicate a number of symbols in which the SRS is to be transmitted, and may indicate a number of repetitions for the SRS. For example, each SRS resource may be configured with N OFDM symbols and R repetitions, N and R being positive integer numbers. If R<N, there are N/R frequency hops within the SRS resource.

Figure 5:
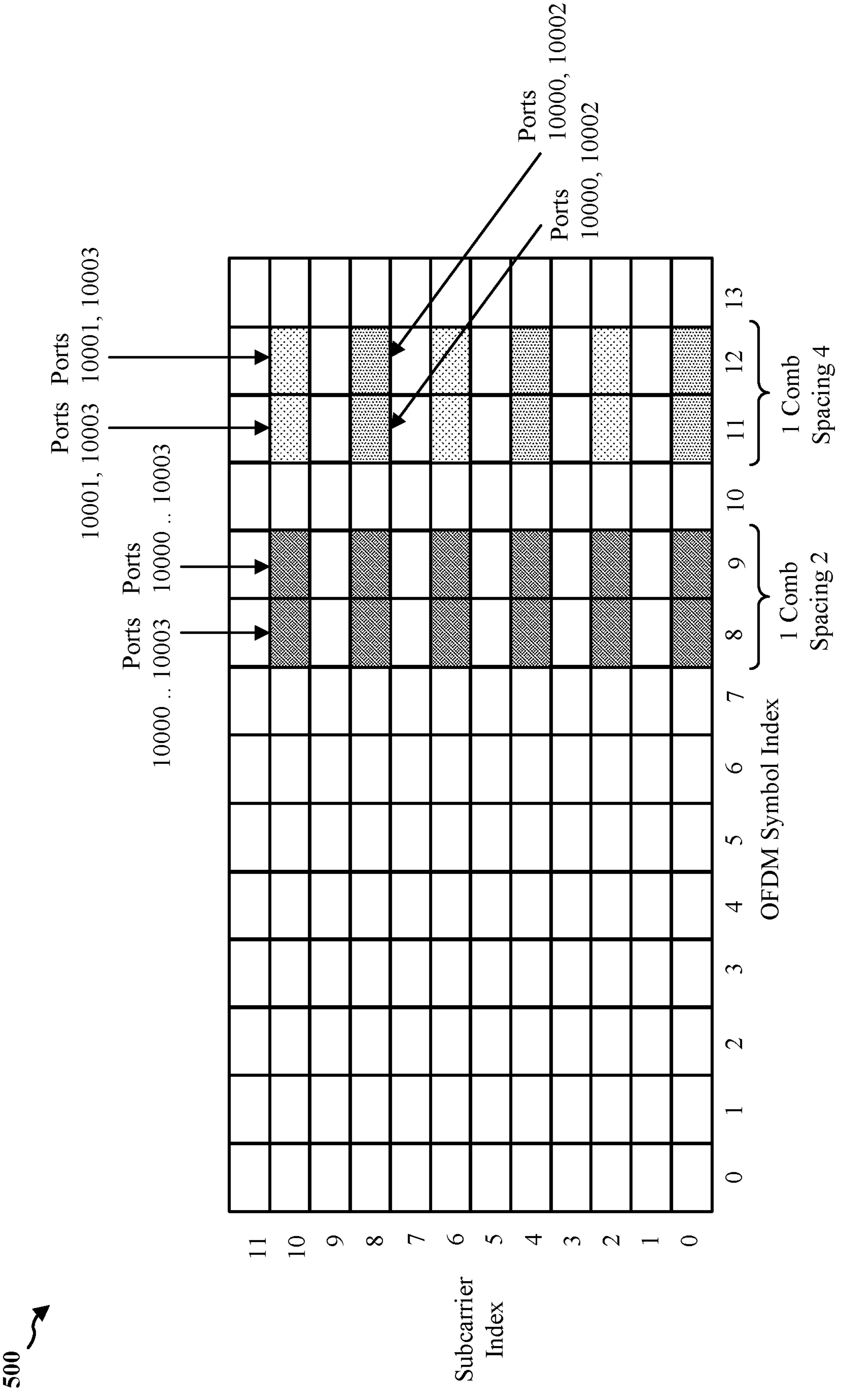
FIG. 5 illustrates a time and frequency resource diagram showing example aspects of SRS transmission.

An SRS resource may correspond to one or more SRS ports. Each SRS port may correspond to an actual UE physical antenna, or a virtual antenna constructed based on an analog, digital, or other operation of the UE physical antennas. Each SRS port may be represented by a port identifier (ID). For an SRS resource associated with multiple SRS ports, different cyclic shifts and/or different comb offsets may be used for SRS transmission from different SRS ports. As used herein, the term "cyclic shift" may refer to a bitwise operation of moving one or more bits at an end to a beginning and shifting other entries to later positions. As an example, in each symbol, a set of SRS ports may be sounded either via different subcarriers, or in overlapping subcarriers with different cyclic shifts and different comb offsets. FIG. 5 is a diagram 500 illustrating an example of multiplexing of SRS transmissions from different SRS ports of a UE. As illustrated in FIG. 5, in a first example, with N=2 symbols and R=2 repetitions, 4 SRS ports (e.g., SRS ports 10000, 10001, 10002, and 10003) are sounded (e.g., an SRS transmission is transmitted from the 4 SRS ports of the UE in each SRS symbol) in the same two SRS symbols (e.g., symbol indexes 8 and 9) and with the same comb spacing and comb offset (e.g., on the same REs) using four different cyclic shifts. For example, the SRS transmission is transmitted from a first SRS port with a first cyclic shift, from a second SRS port with a second cyclic shift, from a third SRS port with a third cyclic shift, and from a fourth SRS port with a fourth cyclic shift. In a second example, N=2 symbols, and R=2 repetitions, 4 SRS ports (e.g., SRS ports 10000, 10001, 10002, and 10003) are sounded in each SRS symbol, e.g., in symbol indexes 11 and 12, with two different cyclic shifts and two different comb offsets. For example, the UE transmits SRS transmissions from SRS ports 10001 and 10003 with a comb spacing of 4 and a comb offset of 2, e.g., using a first cyclic shift for the SRS transmission from SRS port 10001 and a second cyclic shift for the SRS transmission from SRS port 10003. The UE also transmits SRS transmissions from SRS ports 10000 and 10002 with a comb spacing of 4 and a comb offset of 0, using different cyclic shifts for the SRS transmissions from the SRS ports 10000 and 10002.

In some aspects, the network may indicate to one or more UEs that previously scheduled uplink transmissions are canceled. As an example, the network may transmit an uplink cancellation indication (ULCI) indicating the cancellation of the UE's transmission. As an example, DCI format 2_4 may indicate an ULCI. The DCI may be a group common DCI, e.g., that provides control information to multiple UEs.

Figure 6:
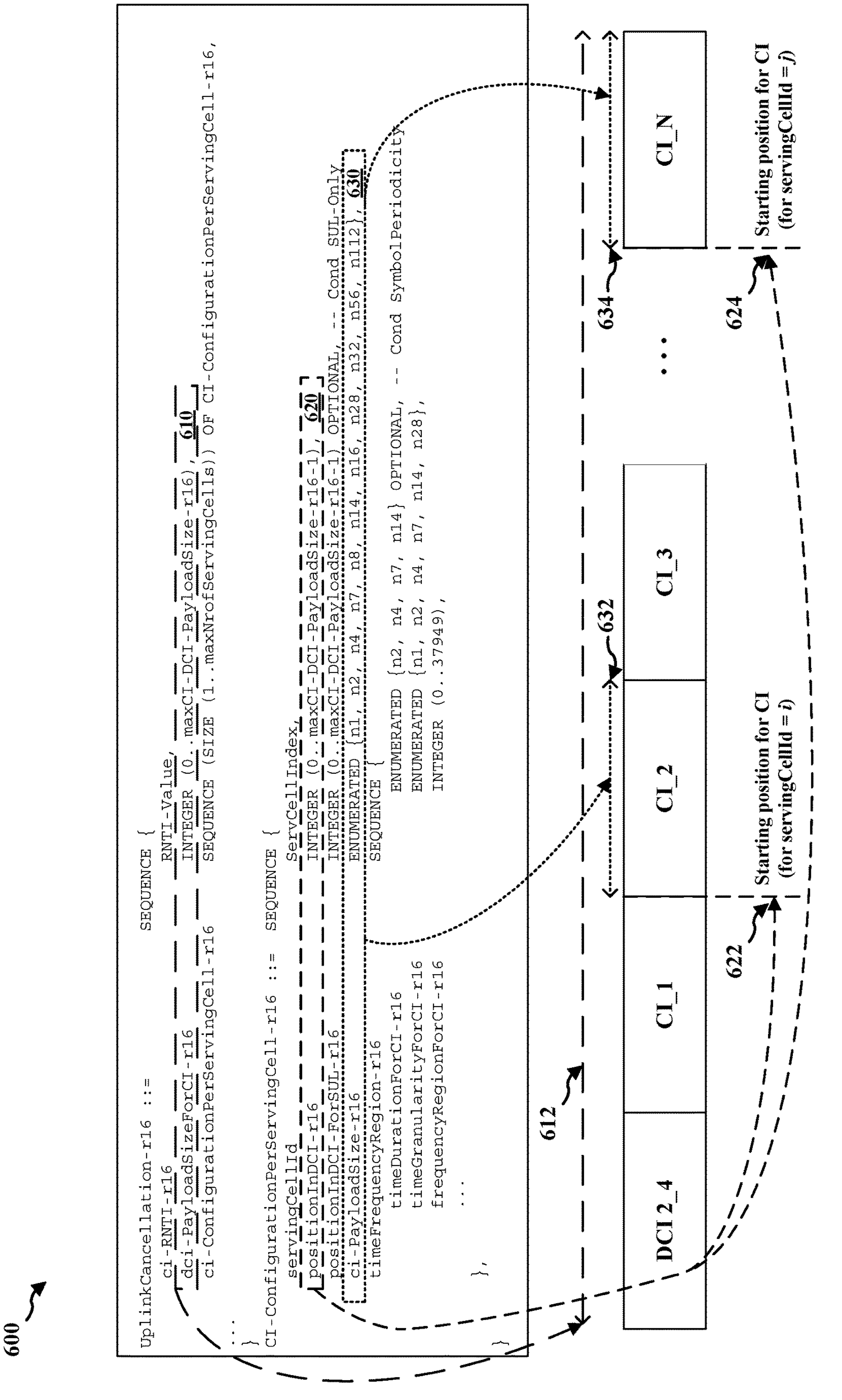
FIG. 6 illustrates example aspects of a radio resource control (RRC) configuration for an uplink cancellation indication (ULCI).

The ULCI allows the network to reclaim previously assigned resources by cancelling the transmission from one or more UEs. As one example, the ULCI may be used for inter-UE eMBB/URLLC. For example, a first UE may be assigned UL resources for less urgent (e.g. eMBB) traffic, and urgent URLLC traffic may arrive for transmission at a second UE. In order to assign the same (or a part of) the resources previously assigned to the first UE to allow for the URLLC transmission of the second UE, the network may indicate to the first UE to cancel the uplink transmission, e.g., in order to avoid interference to the second UE's UL transmission. The network may provide the UE with an RRC configuration to be used for ULCI monitoring, e.g., in order to receive and interpret an ULCI from the network. FIG. 6 illustrates an example of information 600 that may be provided to the UE in an RRC configuration for an ULCI configuration. The RRC configuration may include a DCI payload size 610 for the ULCI, a starting position within the DCI for each of one or more cells, e.g., a serving cell ID and corresponding position in DCI 620 indication, and/or a cancellation indication (CI) payload size 630 that indicates the size 632 or 634 of individual CIs within the ULCI 612. FIG. 6 illustrates a starting position of 622 for the CI_2, which corresponds to a first cell, which may be represented as serving cell ID i; and a starting position of 624 for a serving cell represented as serving cell ID j.

Figure 7:
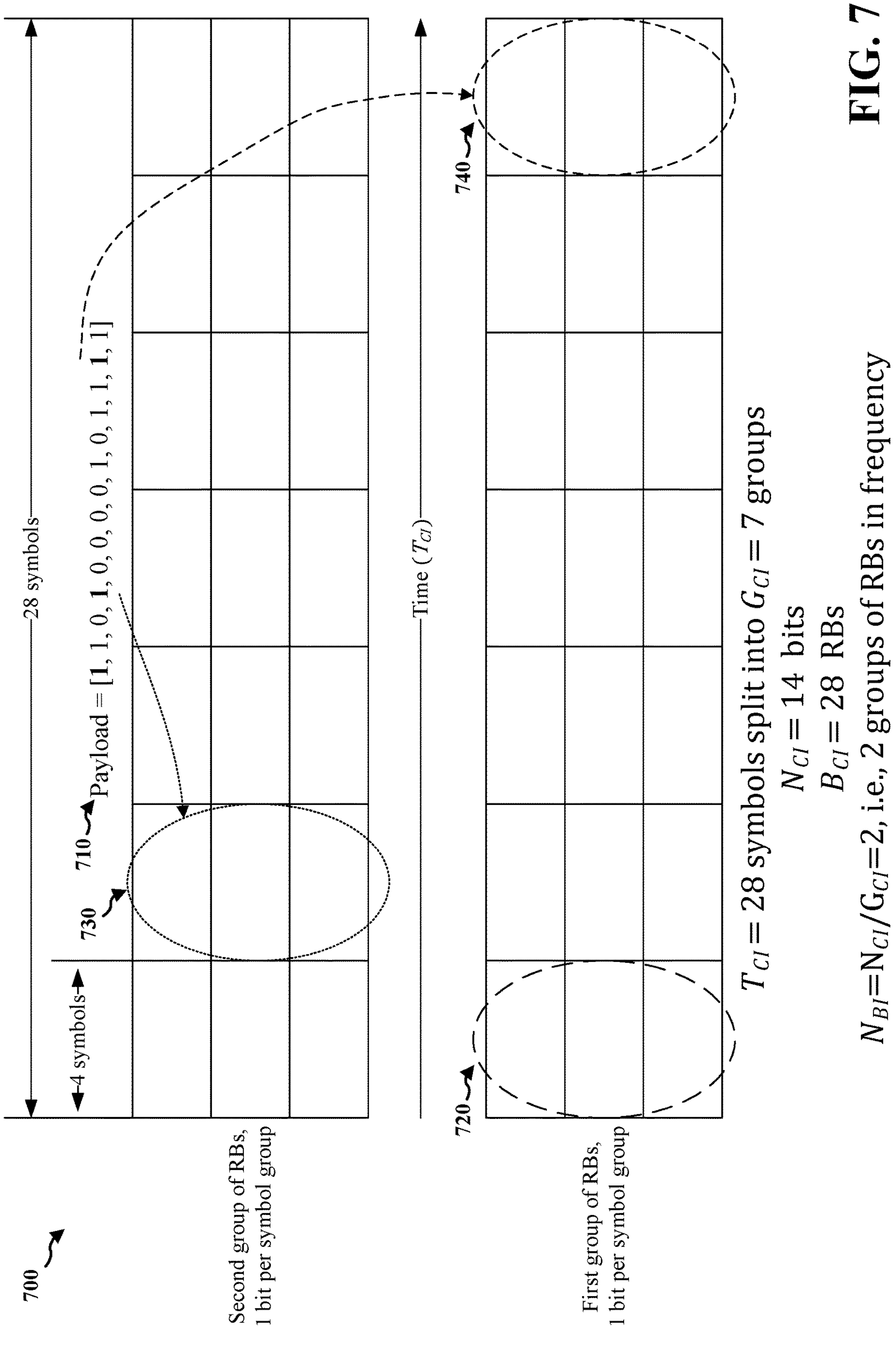
FIG. 7 illustrates example aspects of ULCI.

For a single CI field (e.g., corresponding to a particular CC/serving cell ID), the UE may be provided with one of more of a number of bits for the CI field in the DCI (e.g., $N_{CI}$: ci-PayloadSize), a number of RBs defining the frequency span of the ULCI (e.g., $B_{CI}$), a number of symbols excluding the DL symbols defining the time span of the ULCI (e.g., $T_{CI}$), and/or a number of partitions within the $T_{CI}$ symbols (e.g., $G_{CI}$). Based on this information, the CI field in the DCI may be interpreted as $G_{CI}$ sets of bits from $N_{CI}$ bits having a one-to-one mapping to symbol groups. For group of symbols, $$N_{BI} = \frac{N_{CI}}{G_{CI}}$$

bits from each set of bits have a one-to-one mapping with $N_{BI}$ groups of PRBs. FIG. 7 illustrates an example time and frequency diagram 700 showing an example ULCI payload 710 showing the cancelation of symbols groups 720, 730, and 740.

Figure 8:
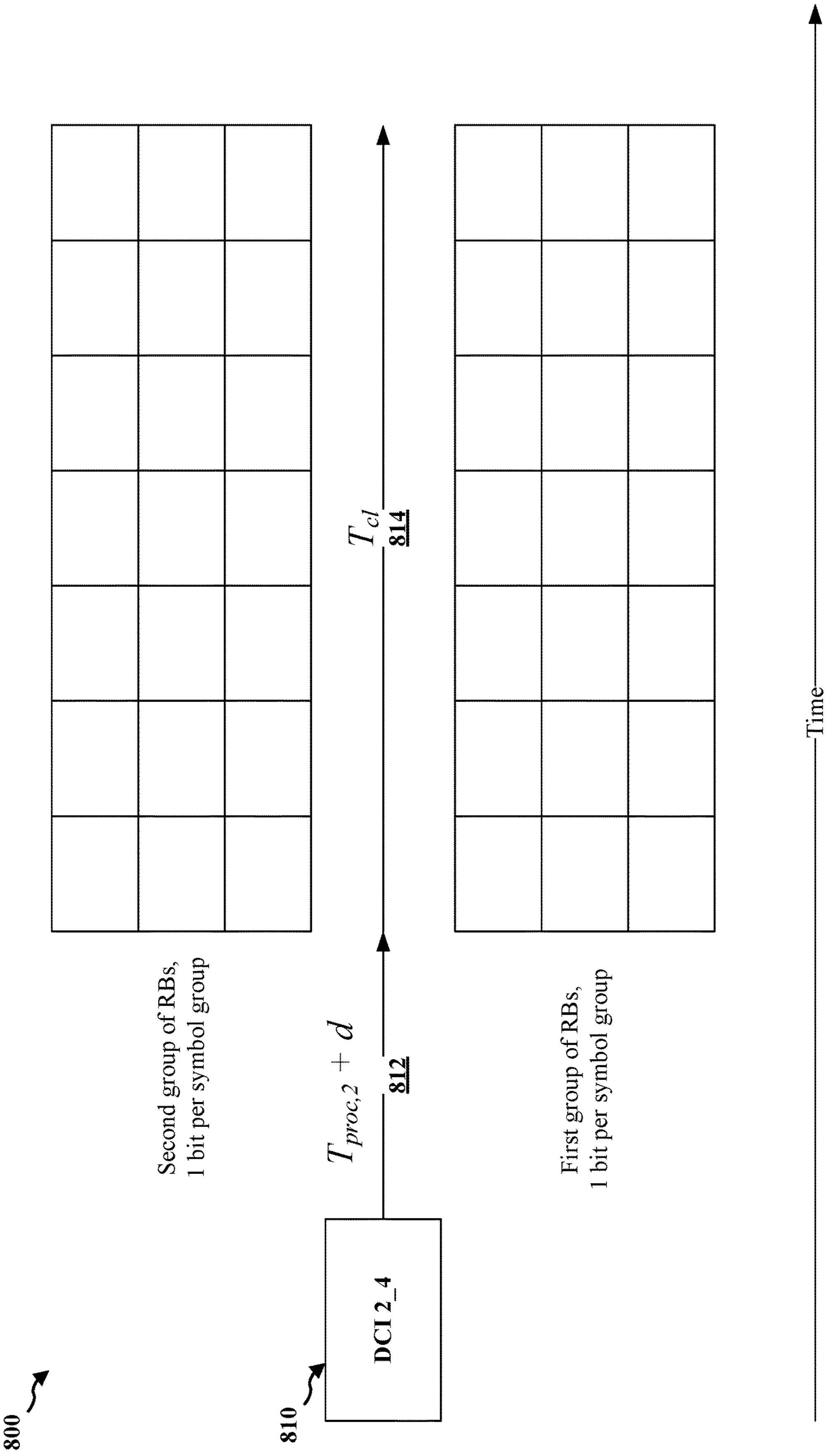
FIG. 8 illustrates example aspects for the timing application of cancelled resources based on an ULCI.

FIG. 8 includes a resource diagram 800 that shows that the UE may apply the cancellation 814 at a first symbol of the $T_{CI}$ symbols that starts after $T_{proc,2}$+d symbols (e.g., 812) from the end of PDCCH reception that carries DCI format 2_4 (e.g., 810). The UE may report the time $d \in \{0,1,2\}$ as a UE capability that the UE indicates to the network. The time period $T_{proc,2}$ may correspond to a UE processing time for PUSCH. In some aspects, an assumption or default may be for $d_{2,1}=0$, $N_2$ of minimum processing capability 2.

The ULCI may be applicable to PUSCH and/or SRS transmissions that have resources overlapping with the indicated canceled resources in the CI (e.g., in time and frequency). For PUSCH, a cancellation without resume may be supported (e.g., in which the UE applies the cancellation from the earliest indicated symbol to the end of the PUSCH, e.g., without resuming the PUSCH transmission if there are remaining time resources after the canceled resources. If the PUSCH is scheduled with multiple repetitions, the UE may apply the cancellation per repetition, e.g., if a prior repetition is canceled, the UE may still transmit the following repetition if the resources are not canceled. For SRS, the cancellation may be on a symbol basis.

Figure 9:
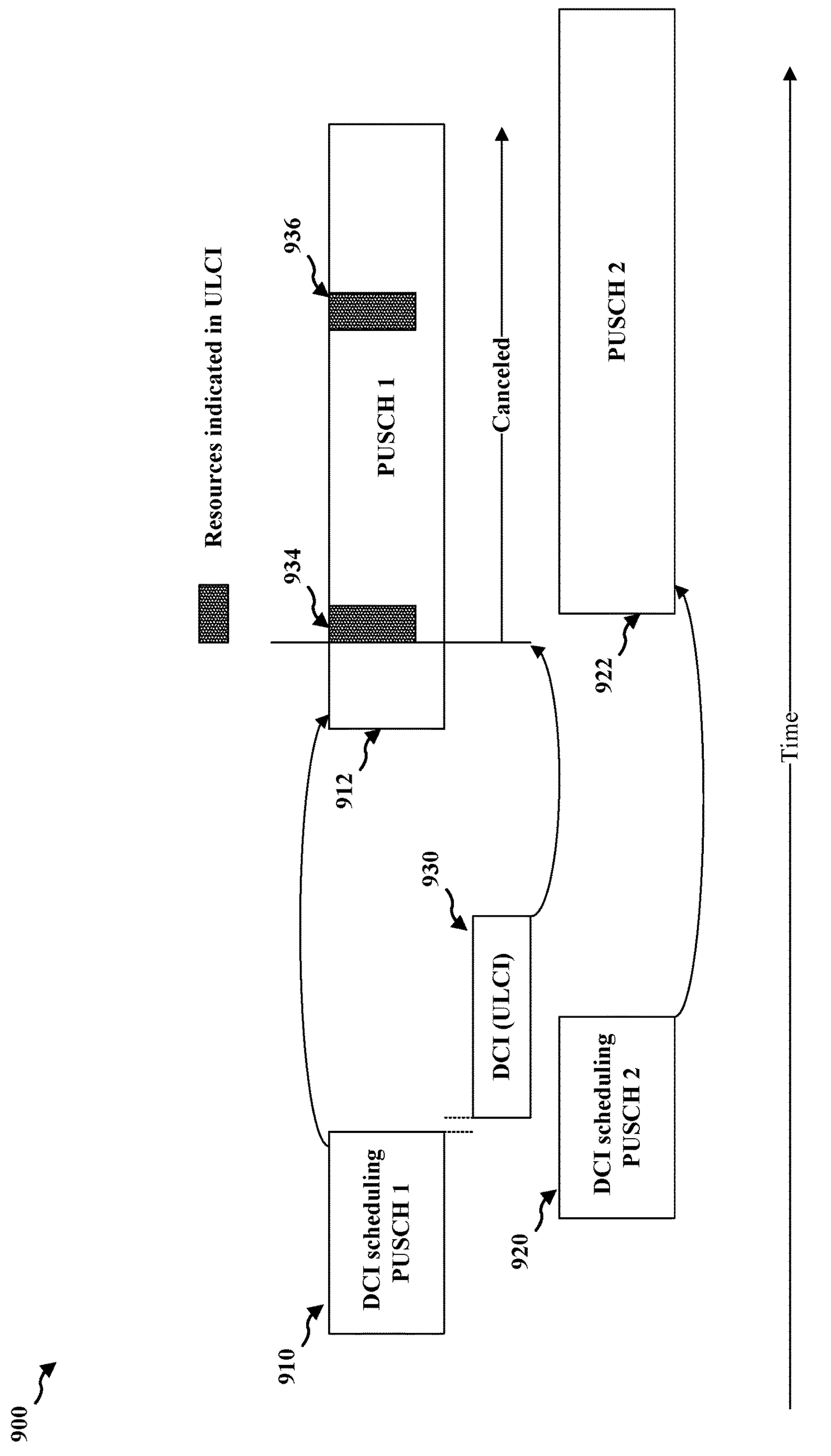
FIG. 9 illustrates timing aspects for ULCI.

If the PUSCH and/or SRS is scheduled by a DCI, the UE may apply the cancellation indicated in an ULCI if a last symbol of the scheduling DCI is earlier than the first symbol of the of the DCI that carries the ULCI. FIG. 9 illustrates an example time diagram 900 showing a DCI 910 that schedules a PUSCH 1 912, and a DCI 920 that schedules a PUSCH 2 922. A DCI 930 (e.g., DCI format 2_4) includes an ULCI canceling resources 934 and 936. The UE may cancel the indicated resources of the PUSCH 1 912, because the last symbol of the DCI 910 is prior to the first symbol of the DCI 930 carrying the ULCI. In contrast, the UE may not cancel the PUSCH 2 922 because the DCI 920 does not end until after the DCI 930 starts. As illustrated, the UE may cancel the PUSCH 1 912 transmission starting at the time of the first canceled resource (e.g., 934).

The UE may further consider a priority of the PUSCH, e.g., which may be based on an RRC configuration such as applicabilityforCI. If the RRC parameter (e.g., applicabilitytyforC) is configured, the UE may apply the ULCI cancellation to PUSCH with a low priority (e.g., priority 0) and not to PUSCH having a higher priority. Otherwise, the UE may apply the cancellation indicated by the ULCI without regard to a priority of the PUSCH.

In some aspects, the SRS transmission from different SRS ports may be transmitted with a TD-OCC. For example, the UE may transmit the SRS in two different REs that are on the same subcarrier but different symbols, and the two SRS ports may be code division multiplexed (CDMed) using an OCC of {1,1} and {1,−1}. That is, in the first RE, p1+p2 may be transmitted, and in the $2^{nd}$ RE, p1−p2 may be transmitted, where p1 represents the SRS of first port and p2 represents the SRS of the second port. In another example, for 4 SRS ports, a 4 port TD-OCC={{1,1,1,1}, {1,−1,1,−1}, {1,1,−1,−1}, {1,−1,−1,1}} can be used: p1+p2+p3+p4 on the first symbol, p1−p2+p3−p4 on the second symbol, p1+p2−p3−p4 on the third symbol, p1−p2−p3+p4 on the fourth symbol, where p3 represents the SRS for the third port and p2 represents the SRS for the fourth port. For a TD-OCC of length X, where X is a power of 2 (2, 4, 8, . . . ), orthogonal codes such as Walsh codes of length X may be used across X symbols. Walsh code may be orthogonal codes where all the members in the set are orthogonal to each other. Other codebooks such as DFT-based or e.g., {1, j, 1, j}, {1, −j, 1, −j} may be also used for TD-OCC. TD-OCC can be also used across different UEs, or across different ports of a UE and across different UEs. As an example, a first UE (UE1) may be configured with an SRS resource for 2 SRS ports using a TD-OCC of {1,1,1,1} and {1,−1,1,−1} across 4 OFDM symbols. A second UE (UE2) may be configured with an SRS resource with 2 ports using a TD-OCC of {1,1,−1,−1} and {1,−1,−1,1} across 4 OFDM symbols. Table 3 below shows an example configuration of the first UE and the second UE:

TABLE 3

| | Symbol 1 | Symbol 2 | Symbol 3 | Symbol 4 |
|---|---|---|---|---|
| First SRS port of UE1 | 1 | 1 | 1 | 1 |
| Second SRS port of UE1 | 1 | −1 | 1 | −1 |
| First SRS port of UE2 | 1 | 1 | −1 | −1 |
| Second SRS port of UE2 | 1 | −1 | −1 | 1 |

As the same cyclic shift and the same comb offset may be used for multiple SRS ports of the SRS resource, or for multiple UEs, the overall capacity for the SRS sounding of multiple SRS ports (e.g., and overlapping SRS sounding of different UEs) may be increased.

As multiple transmission reception points (TRPs) may receive SRS transmissions from an individual UE, and a communication system may include multiple UEs for which the network obtains SRS measurements, multiple UEs may transmit SRS on the same time and/or frequency resources. The overlapping SRS transmissions may cause interference. As an example, wireless communication between a network and UE may include coherent joint transmission (CJT) across multiple TRPs. In some aspects, the CJT may include synchronization as well as the same number of antenna ports across TRPs. SRS multiple UEs may cause interference to each other enhancements to manage SRS interference across different UEs may be needed.

Aspects presented herein provide improvements to SRS to manage inter-TRP cross-SRS interference, e.g., which may be applicable for time domain duplex (TDD) CJT by providing SRS capacity and/or interference improvements, e.g., without consuming additional resources for SRS, reusing SRS comb structure, and without new SRS root sequences.

Figure 10:
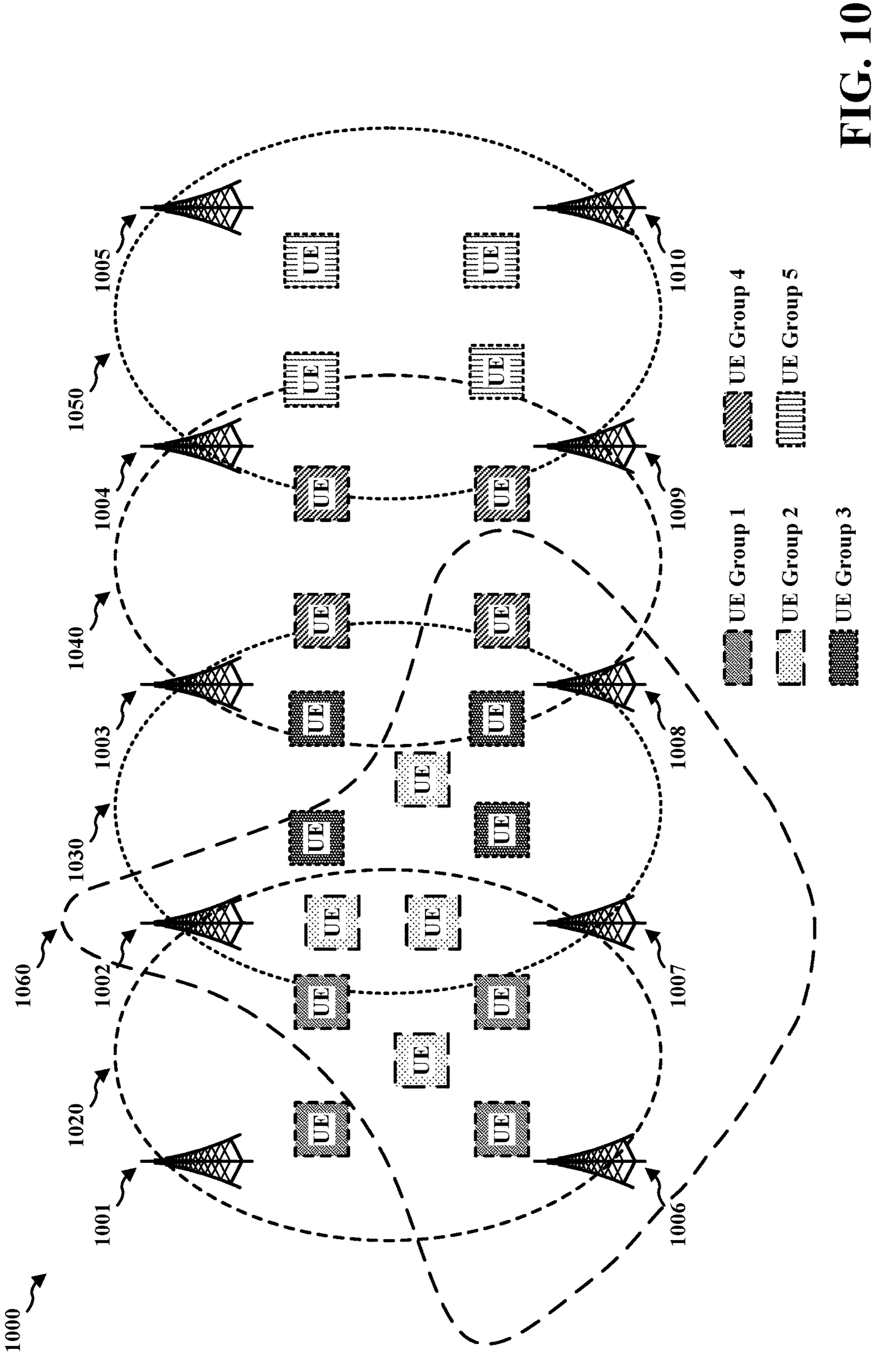
FIG. 10 illustrates a network with multiple TRP based wireless communication.

FIG. 10 illustrates and example diagram 1000 of a wireless network showing groups 1020, 1030, 1040, and 1050 served by multiple TRPs. For example, the group 1020 may include a set of UEs that is served by the TRPs 1001, 1002, 1006, and 1007. The group 1030 includes a set of UEs that is served by the TRPs 1002, 1003, 1007, and 1008. The group 1040 includes a set of UEs that is served by the TRPs 1003, 1004, 1008, and 1009. The group 1050 includes a set of UEs that is served by the TRPs 1004, 1005, 1009, and 1010. FIG. 10 illustrates an example cluster 1060 for CJT-MU communication with multiple UEs. For example, the cluster 1060 includes a cluster size of 4 and includes 4 UEs. The multiple TRPs receive SRS transmission from a given UE, and each TRP receives SRS transmissions from multiple UEs. When there is a larger number of UEs, the UEs are more likely to transmit SRS on the same OFDM symbols. In some aspects, interference randomization may be applied for inter-cluster interference. An interference randomization mechanism may include group hopping and sequence hopping (in a SRS base sequence domain) to help mitigate or reduce interference among SRS transmissions from different UEs. In some aspects, cyclic shift hopping or comb offset hopping may help to mitigate interference among UEs. The UEs may transmit the SRs transmissions with an increased power relative to other transmissions, e.g., in order to enable multiple TRPs to estimate a channel for CJT. The increased transmission power may lead to increased interference among UEs due to the SRs transmissions.

In order to mitigate or reduce interference, SRS transmissions may be muted on a transmission occasion, e.g., in a symbol, for some UEs. SRS muting for UEs in a pseudo-random manner may reduce interference, e.g., especially for inter-cell or inter-cluster interference due to SRS transmissions.

Through the muting, the interference level in the system may be reduced as some SRS occasions for some UEs can be muted. For a given SRS occasion of a given UE, in different transmission instances (in different slots/symbols), different sets of UEs create interference based on the muting, which helps to reduce or avoid a consistent interference.

In some aspects, instead of pseudo-random muting, SRS muting in TDD CJT may be applied in a more controllable manner using an uplink cancellation indication mechanism. The ULCI may be configured to cancel the SRS transmission (e.g., and eMBB PUSCH) early, and reserve available uplink resources for URLLC PUSCH. Aspects presented herein provide for SRS muting that allows for the cancellation of more than one transmission occasion. Aspects presented herein provide for an ULCI that cancels SRS over a time domain, a frequency domain, and/or a code domain. Aspects presented herein enable SRS muting at slot-level, which allows for less frequent monitoring of DCI format 2_4 by the UE. In the frequency domain, the cancellation granularity is enabled as a subset of REs within an RB, to allow for muting of SRS resources within a comb structure. The proposed ULCI enables cancellation of multiple SRS transmission occasions, e.g., which may be more efficient for semi-persistent/periodic SRS by providing a more persistent muting for semi-persistent/periodic SRS.

Various technologies pertaining to an enhanced ULCI mechanism are described herein. The ULCI mechanism may allow for different granularities of ULCIs. For instance, the granularities may be in the time domain, the frequency domain, or the code domain. Furthermore, the ULCI mechanism may enable cancellation of more than one transmission occasion for a semi-persistent/periodic SRS. In an example, a UE receives a configuration for a sounding reference signal (SRS). The UE receives an uplink cancellation indication configuration. The UE receives a cancellation indication canceling at least a portion of the SRS including one or more of: time resources extending over one or more slots, a subset of resource elements within a resource block, or at least one code domain parameter of the SRS. The aforementioned example may provide for different granularities of ULCIs and may enable cancellation of more than one transmission occasion for a semi-persistent/periodic SRS.

Figure 11:
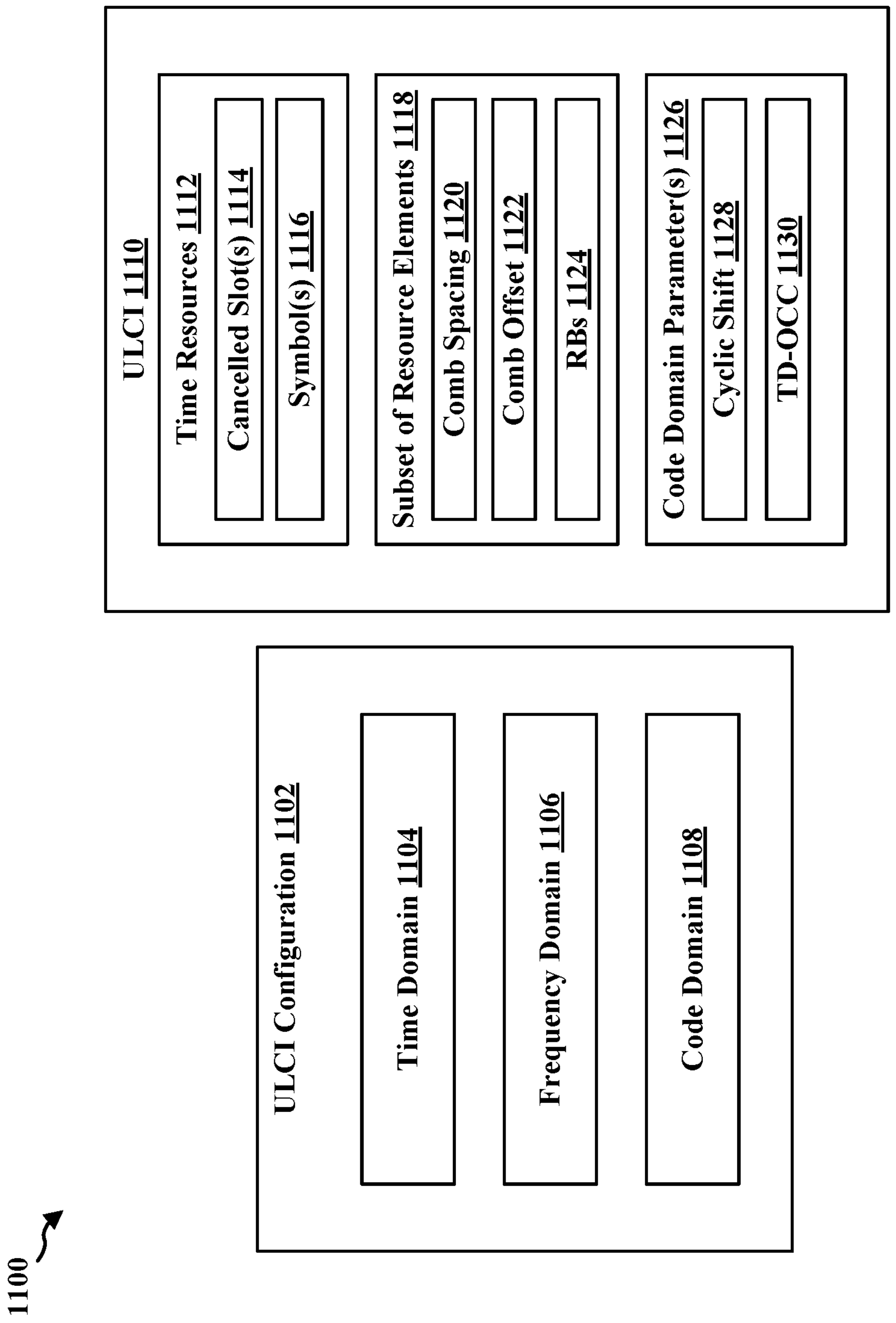
FIG. 11 illustrates an example ULCI configuration that provides for the cancellation of uplink resources for SRS in on or more of a time domain, a frequency domain, and/or a code domain.

FIG. 11 is a diagram 1100 illustrating an example of a ULCI configuration 1102 and a ULCI 1110. The ULCI configuration 1102 may include parameters with respect to a time domain 1104, a frequency domain 1106, and/or a code domain 1108. In one aspect, a ULCI configuration (e.g., the ULCI configuration 1102) may provide for time domain and frequency domain enhancements. In an example, if a ULCI (e.g., the ULCI 1110) such as an ULCI indicated by DCI format 2_4, the ULCI configuration may apply to SRSs that have resources that overlap with indicated cancelled resources in the ULCI (in time and frequency) according to the ULCI configuration. In an example, a UE may receive the ULCI configuration 1102, e.g., in an RRC configuration that enables the UE to receive an interpret the ULCI, such as described in connection with FIG. 6. Subsequently, the UE may receive the ULCI 1110. The ULCI 1110 may cancel (e.g., indicate for the UE to skip) one or more SRS transmissions. The UE may receive and interpret the ULCI 1110 based on the previously received ULCI configuration 1102.

In the time domain 1104, the ULCI configuration may allow for a slot-level time domain configuration. In one example, the ULCI configuration may include a parameter indicating a number of slots (e.g., excluding slots where an SRS cannot be scheduled) defining a time span of a ULCI at a slot level. As an example, the parameter may be referred to as $T_{CI,slot}$, and may be provided by "timeDurationforCllnSlot" in a "timefrequencyRegion" configuration. A first slot of $T_{CI,slot}$ for which the UE cancels the SRS transmission, may start after $T_{proc,2}$+d symbols from an end of a PDCCH transmission reception that carries a DCI format 2_4, e.g., as described in connection with FIG. 8. In another example, the ULCI configuration may allow $T_{CI}$ to be greater than 14 symbols. A first symbol of $T_{CI}$ may start after $T_{proc,2}$+d symbols from an end of a PDCCH transmission reception that carries a DCI format 2_4, e.g., as described in connection with FIG. 8. The indication of resources in the time domain allows for an extension of the cancelation at a slot level, while continuing to allow for a symbol level cancellation. For example, the slot level cancellation may be applied on top of, or in combination with, the symbol level cancellation.

In one aspect, the ULCI configuration may allow for flexible granularities for a payload indication. For the $T_{CI/slot}$ example above, each bit of $N_{CI}$ may map to one slot. Alternatively, each bit of $N_{CI}$ may map to multiple slots (e.g., groups of slots). In the $T_{CI}$ example above, each bit of $N_{CI}$ may map to one symbol. Alternatively, each bit of $N_{CI}$ may map to multiple symbols (e.g., groups of symbols), or 14 symbols (i.e., 1 slot). The $T_{CI,slot}$ and the $T_{CI}$ examples above may have different combinations of the aforementioned alternatives. For example, for the $T_{CI}$ example, when $T_{CI}$ is less than or equal to 14 symbols, each bit of $N_{CI}$ may map to one symbol, and when $T_{CI}$ is greater than 14 symbols, each bit of $N_{CI}$ may map to 14 symbols.

In an example, if a condition of a "PDCCH monitoring periodicity for a search space set with a DCI format 2_4 is one slot and there is more than one PDCCH monitoring occasion in a slot" is not satisfied, $T_{CI}$ may be set to a PDCCH monitoring periodicity. The ULCI configuration described above may improve upon this behavior. For instance, the PDCCH monitoring periodicity may be 4 slots (i.e., the UE monitors for a DCI every 4 slots) and a configured $T_{CI}$=16×14=224 (e.g., a ULCI indicates cancellation for the next 16 slots as in the $T_{CI,slot}$ example above), If a base station does not change a PDCCH monitoring periodicity decision, the base station may not send a DCI for the next 3 monitoring occasions, and DCI overhead may be saved. Similarly, a UE may monitor for a DCI every 4 slots, and a latest detected DCI may overwrite a previously indicated cancellation, thereby providing the base station with greater flexibility for indicating cancellations.

In the frequency domain 1106, the ULCI configuration may include a Ku parameter and a $\overline{\kappa}_{CI}$ parameter. The $K_{CI}$ parameter may refer to a comb spacing number provided by "combSpacingForCI" in "timeFrequencyRegion", e.g., as described in connection with FIGS. 4B and 5. The $\overline{\kappa}_{CI}$ parameter may refer to the comb offset provided by "combOffsetForCI" in "timeFrequencyRegion", e.g., as described in connection with FIG. 4B and FIG. 5. If neither the $K_{CI}$ parameter nor the $\overline{\kappa}_{CI}$ parameter are included in the ULCI configuration, a whole RB ($B_{CI}$) may be cancelled. If both the $K_{CI}$ parameter and the $\overline{\kappa}_{CI}$ parameter are included in the ULCI configuration, the indicated RE in each RB may be cancelled.

In the code domain 1108, the ULCI configuration may enable cancelling a specific set of cyclic shifts and/or a specific set of time domain orthogonal cover code (TD-OCC) sequences. The ULCI configuration may include a parameter $$n_{CI}^{CS}.$$

The parameter $$n_{CI}^{CS}$$

may refer to a set of cyclic shift values to be cancelled provided by "cyclicShiftsForCI" in "CI-ConfigurationPerServingCell." If both $K_{CI}$ and $$n_{CI}^{CS}$$

are included in the ULCI configuration, cyclic shifts indicated by $$n_{CI}^{CS}$$

may be cancelled. The ULCI configuration may include a $$n_{CI}^{TD-OCC}$$

parameter. The $$n_{CI}^{TD-OCC}$$

parameter may refer to a set of TD-OCC sequences to be cancelled provided by "TDOCCForCI" in "CI-ConfigurationPerServingCell." If $$n_{CI}^{TD-OCC}$$

is included in the ULCI configuration, the symbols covered by the indicated TD-OCC sequences may be cancelled.

The ULCI 1110 may include an indication of time resources 1112 that extend over one or more slots. The time resources 1112 may include an indication of a number of slots (e.g., 1114) in which an SRS is to be cancelled. The time resources 1112 may include an indication of a number of symbols 1116 (e.g., greater than 14). In an example, a bit in the time resources 1112 may correspond to a symbol, a group of symbols, or a slot.

The ULCI 1110 may include an indication of a subset of resource elements 1118 within a resource block associated with the SRS that are to be cancelled. The indication of the subset of resource elements 1118 may include a comb spacing 1120 for the subset of resource elements that are to be cancelled. The indication of the subset of resource elements 1118 may include a comb offset 1122 for the subset of resource elements that are to be cancelled. The indication of the subset of resource elements 1118 may also include a number of RBs 1124 that the subset of REs is located within.

The ULCI 1110 may include an indication of code domain parameters 1126 associated with the SRS that is to be cancelled. The code domain parameters 1126 may include a cyclic shift 1128. The code domain parameters 1126 may also include a time domain orthogonal cover code (TD-OCC) 1130.

FIG. 12 is an example of a ULCI configuration information element 1200, e.g., with various examples of parameters that the network may RRC configure for the UE to use in receiving ULCI. The ULCI configuration information element 1200 may incorporate some or all of the aspects discussed in the present disclosure. The RRC configuration may include aspects described in connection with FIG. 6. As illustrated in FIG. 12, the ULCI configuration may include a comb spacing for CI (e.g., which may be referred to as "comSpacingForCI", a comb offset for CI (e.g., which may be referred to as a "combOffsetForCI", and/or a set of one or more cyclic shift for CI (which may be referred to as a "cyclicShiftsforCI"). Although not illustrated in FIG. 12, the RRC configuration may further indicate a set of TD-OCC for CI.

Figure 13:
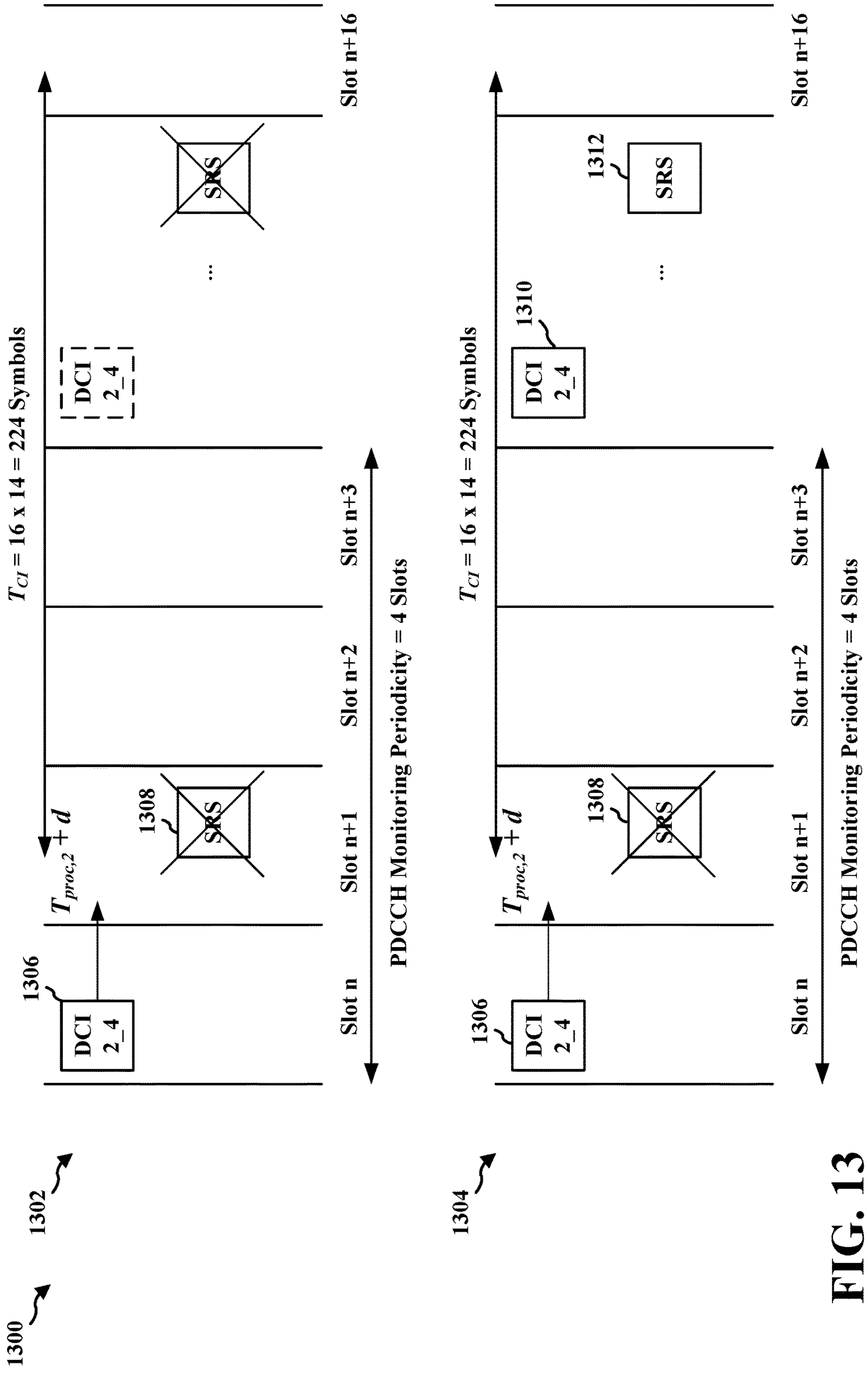
FIG. 13 illustrates an example of cancellation of an SRS transmission based on an ULCI.

FIG. 13 is a diagram 1300 illustrating a first example 1302 and a second example 1304 of a cancellation of one or more SRS transmissions in a time domain that may be provided by the ULCI configuration 1102. The first example 1302 and the second example 1304 may correspond to the Tc/example described above with respect to FIG. 11. In the first example 1302, a UE may receive a first DCI format 2_4 1306 from a base station that cancels a SRS 1308. In the first example 1302, the UE cancels the SRS transmissions throughout the period of time indicated by the ULCI. In the second example 1304, the UE may receive a second DCI format 2_4 1310 from a base station that overrides the previous cancellation in the first example such that the SRS 1312 is not cancelled/skipped, e.g., the UE may resume using the SRS resource in response to DCI 1310 that cancels the remaining portion of the ULCI.

Figure 14:
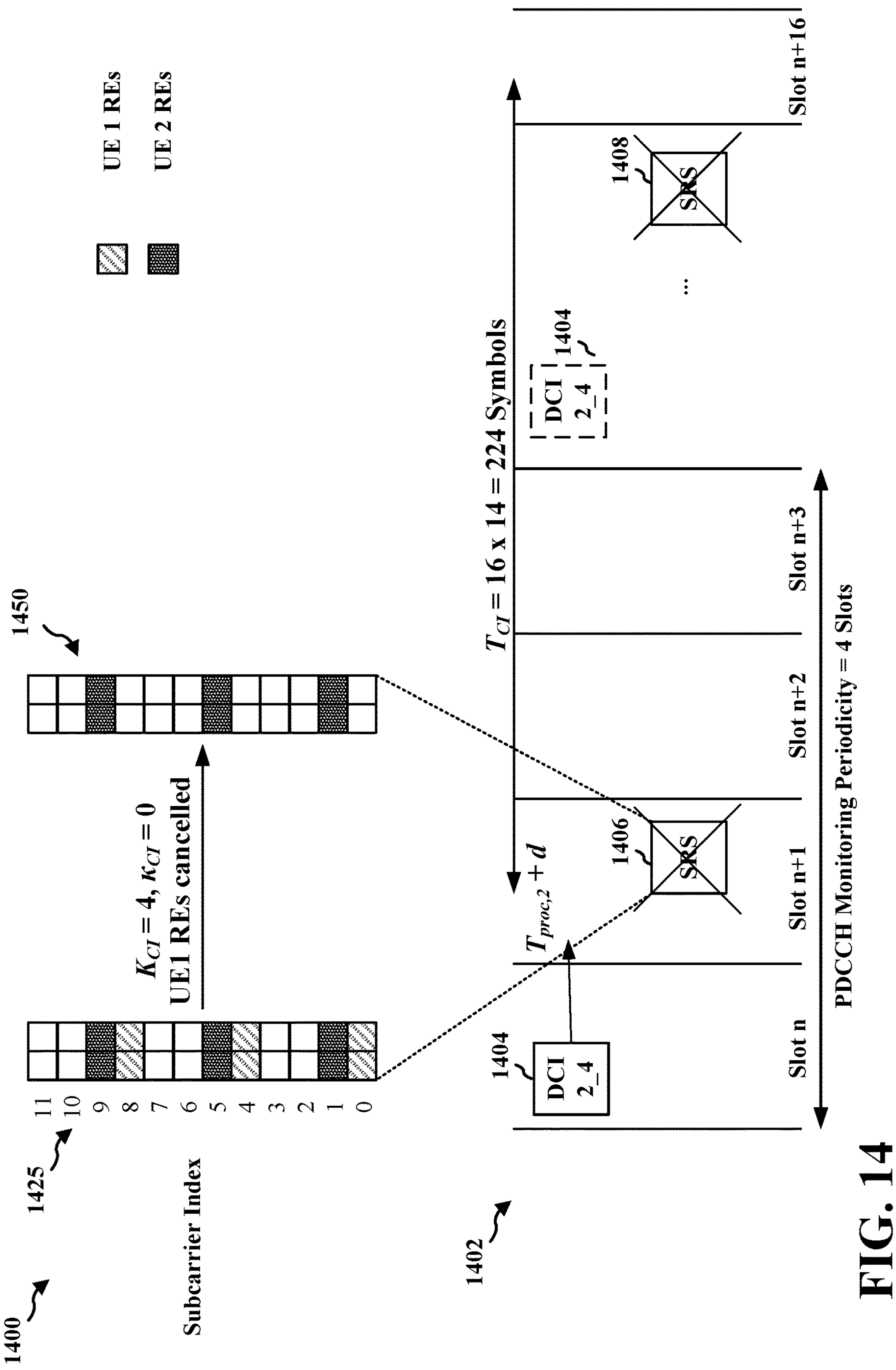
FIG. 14 illustrates an example of cancellation of an SRS transmission based on an ULCI.

FIG. 14 is a diagram 1400 illustrating an example 1402 of a frequency domain efficiency that may be provided by the ULCI configuration 1102. The example 1402 may correspond to the $K_{CI}$ parameter and he $\overline{\kappa}_{CI}$ parameter discussed above. In the example 1402, a UE may receive a DCI format 2_4, e.g., DCI 1404, that cancels a subset of REs (i.e., REs for UE1). The resource diagram 1425 shows the SRS resources initially configured for UE1 and UE2 (or for a first SRS port and second SRS port of a single UE), and the resource diagram 1450 shows that the SRS resources for the UE1 have been cancelled and not transmitted. The subset of REs may be canceled for the SRS transmission occasion 1406 and 1408. If a DCI 1404 is received prior to the SRS transmission occasion 1408 that indicates for the UE to resume use of the resources, the UE may transmit the SRS on the subset of REs that were cancelled by the DCI 1404 in the SRS transmission occasion 1408, e.g., as described in connection with FIG. 13.

Figure 15:
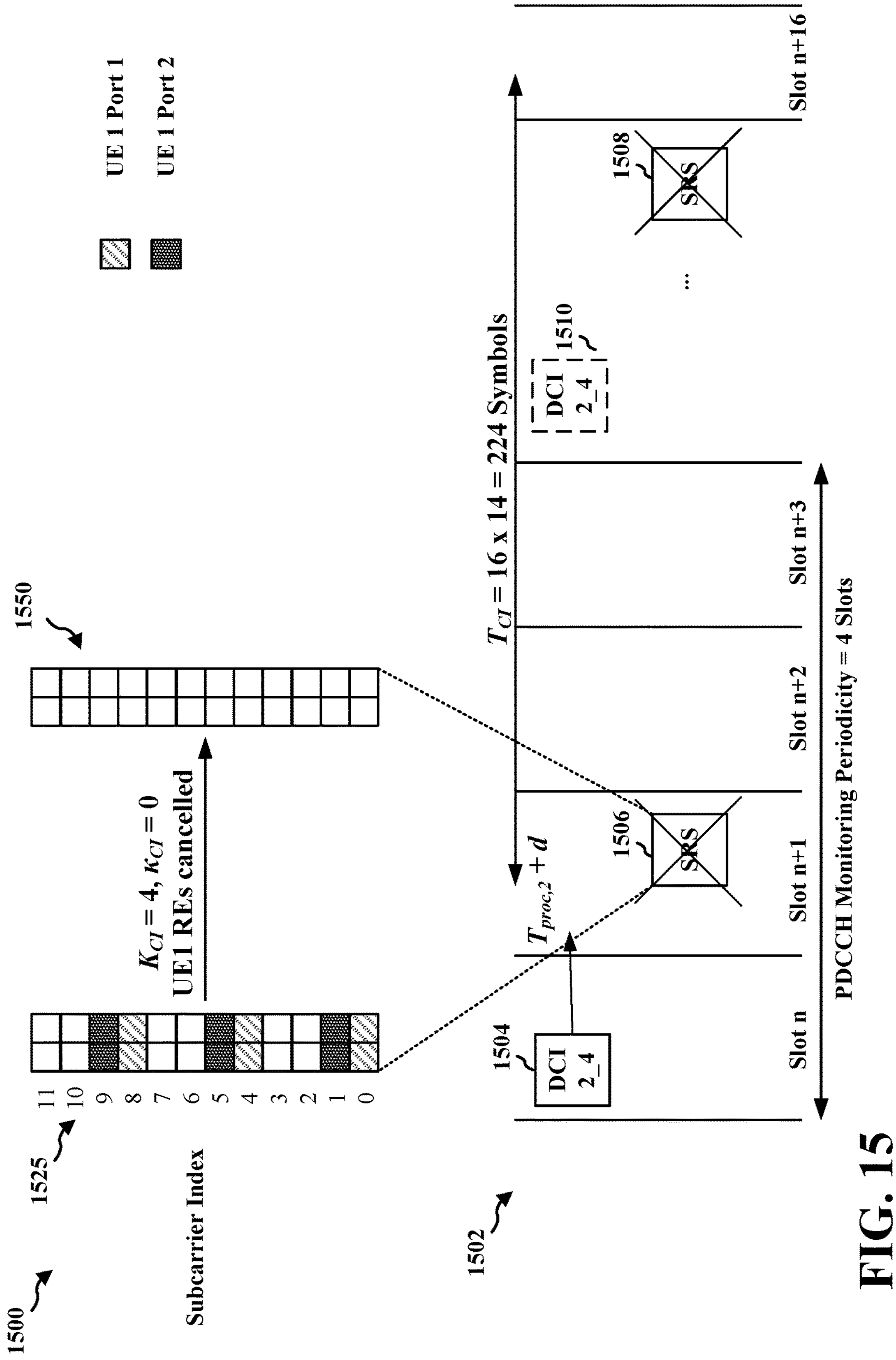
FIG. 15 illustrates an example of cancellation of an SRS transmission based on an ULCI.

FIG. 15 is a diagram 1500 illustrating an example of a frequency domain efficiency that may be provided by the ULCI configuration. The example 1502 may correspond to the $K_{CI}$ parameter and he $\overline{\kappa}_{CI}$ parameter discussed above. In the example 1502, a UE may receive a DCI format 2_4 1504 that cancels a subset of REs (i.e., REs for UE1). In the example 1502, if one port of a UE is cancelled (e.g., UE1 port 1), other ports of the same UE may also be cancelled. The resource diagram 1525 shows the SRS resources initially configured for UE1 and UE2 (or for a first SRS port and second SRS port of a single UE), and the resource diagram 1550 shows that the SRS resources for the UE1 and UE2 (e.g., for both ports of the UE) have been cancelled and not transmitted. The subset of REs may be canceled for the SRS transmission occasion 1506 and 1508. If a DCI 1510 is received prior to the SRS transmission occasion 1508 that indicates for the UE to resume use of the resources, the UE may transmit the SRS on the subset of REs that were cancelled by the DCI 1504 in the SRS transmission occasion 1408, e.g., as described in connection with FIGS. 13 and 14.

Figure 16:
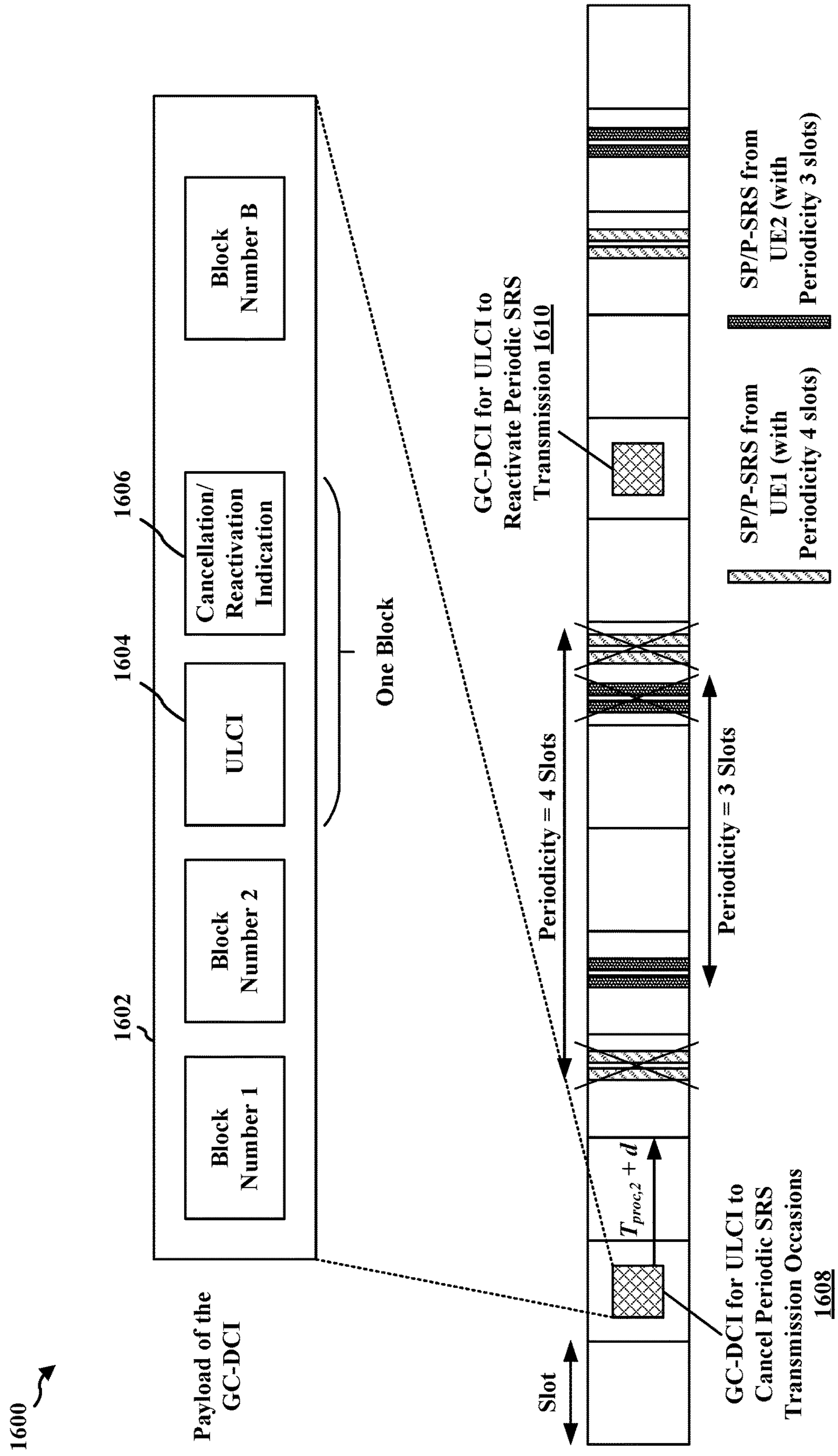
FIG. 16 illustrates an example aspects of an ULCI for a group common downlink control information.

FIG. 16 is a diagram 1600 illustrating an example of a GC-DCI 1602. In one aspect, if the GC-DCI indicates an ULCI for UEs in a given serving cell, the UEs may refrain from transmitting an SRS based on a configured time-frequency region until another GC-DCI reactivates SRS transmissions. In one aspect, a parameter $P_{CI}$ periodicity (in slots) of periodic cancellation may be provided in an RRC configuration for the UE(s). As an example, the periodicity may be indicated by an RRC parameter that may be referred to as "periodicityForCI" in "timeFrequencyRegion." If $P_{CI}$ is not configured in the RRC configuration, a default value of one slot may be set, e.g., applied by the UE. $P_{CI}$ may define periodic transmission occasions for cancellation. One field may be added to each block of a GC-DCI to indicate whether the GC-DCI is for cancellation or reactivation of SRS transmissions. The presence of the field may be RRC configured for each block per UE. In an example, $P_{CI}$ may be 4 slots and both blocks for UE1 and UE2 in the GC-DCI may be configured with a field indicating cancellation/reactivation.

The GC-DCI 1602 may include a number of blocks (e.g., B blocks, where B is a positive integer). The GC-DCI 1602 may include a ULCI 1604. The ULCI 1604 may be associated with the ULCI configuration 1102 described above. The GC-DCI 1602 may also include a cancellation/reactivation indication 1606. When the cancellation/reactivation indication 1606 indicates that a SRS cancelation is to occur, the ULCI 1604 causes a SRS to be skipped/cancelled. For example, at 1608, a UE may receive a GC-DCI that indicates that periodic/semi-persistent SRS transmissions are cancelled (indicated by "X" in the diagram 1600). When the cancellation/reactivation indication 1606 indicates that SRS transmission are to be reactivated, the ULCI 1604 causes SRS transmission to be reactivated. For example, at 1610, a UE may receive a GC-DCI that indicates that periodic/semi-persistent SRS transmissions are to be reactivated. The periodic/semi-persistent SRS transmissions may then be reactivated (indicated by a lack of "X" in the diagram 1600).

Figure 17:
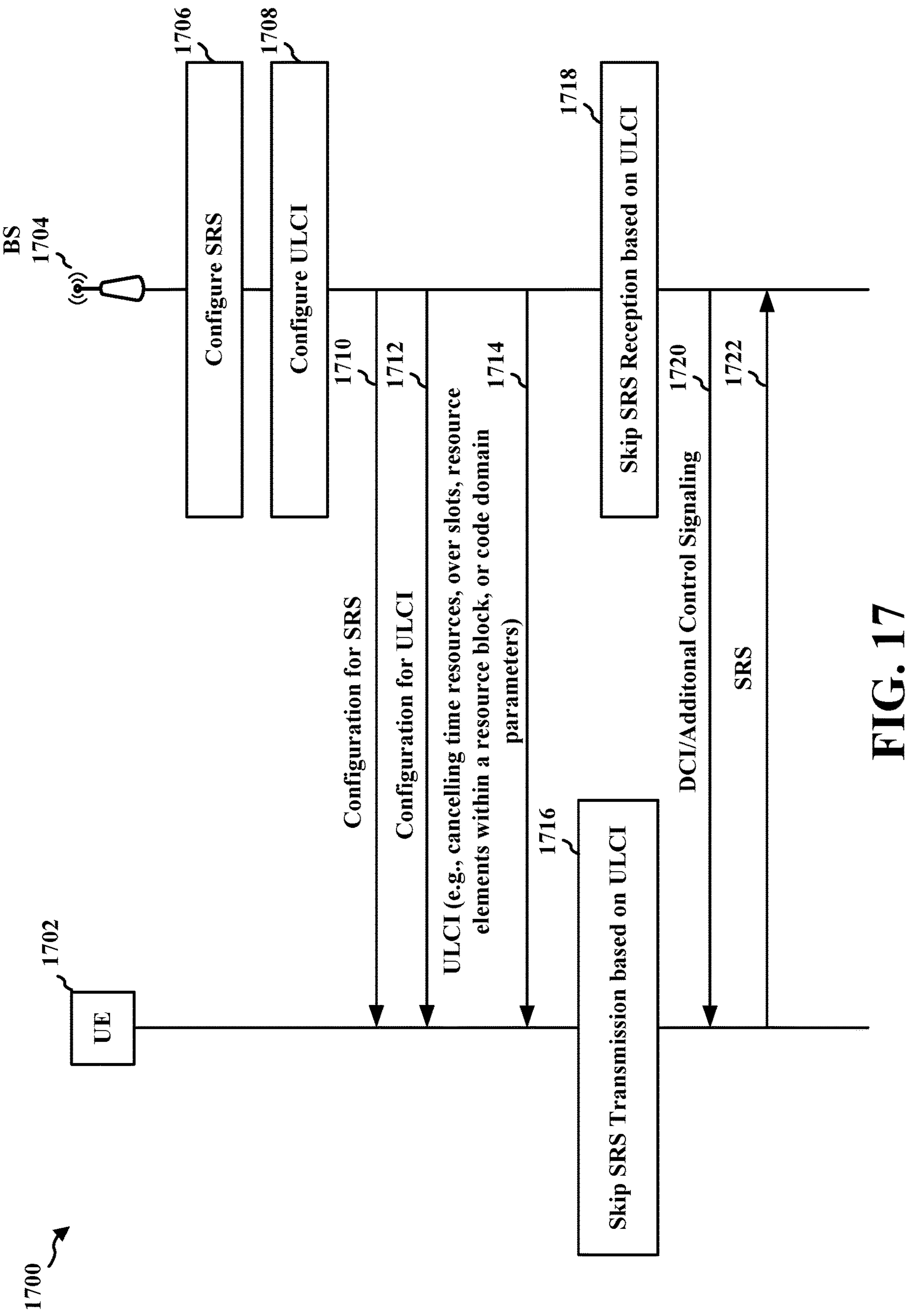
FIG. 17 is an example communication flow diagram between a UE and a network entity.

FIG. 17 is a communication flow diagram 1700 between a UE 1702 and a base station 1704. At 1706, the base station 1704 may configure a SRS for the UE 1702. The SRS configuration may include any of the aspects described in connection with FIG. 4B, 5, or 10. At 1708, the base station 1704 may configure a ULCI for the UE 1702. The configuration may include any of the aspects described in connection with FIGS. 6-8, 11, and 12. At 1710, the UE 1702 may receive a configuration for the SRS from the base station 1704. At 1712, the UE 1702 may receive a configuration for the ULCI (e.g., the ULCI configuration 1102) from the base station 1704.

At 1714, the UE 1702 may receive a ULCI from the base station 1704. At 1716, the UE 1702 may skip an SRS transmission based on the ULCI. At 1718, the base station 1704 may skip reception of a SRS based on the ULCI transmitted at 1714. At 1720, the base station 1704 may transmit a DCI/additional control signaling to the UE 1702 that indicates that SRS transmission is to resume. At 1722, the UE 1702 may transmit an SRS in response to receiving the DCI/additional control signaling. The cancellation of the SRS transmission may include any of the aspects described in connection with FIG. 9 or 13-16, for example.

Figure 18:
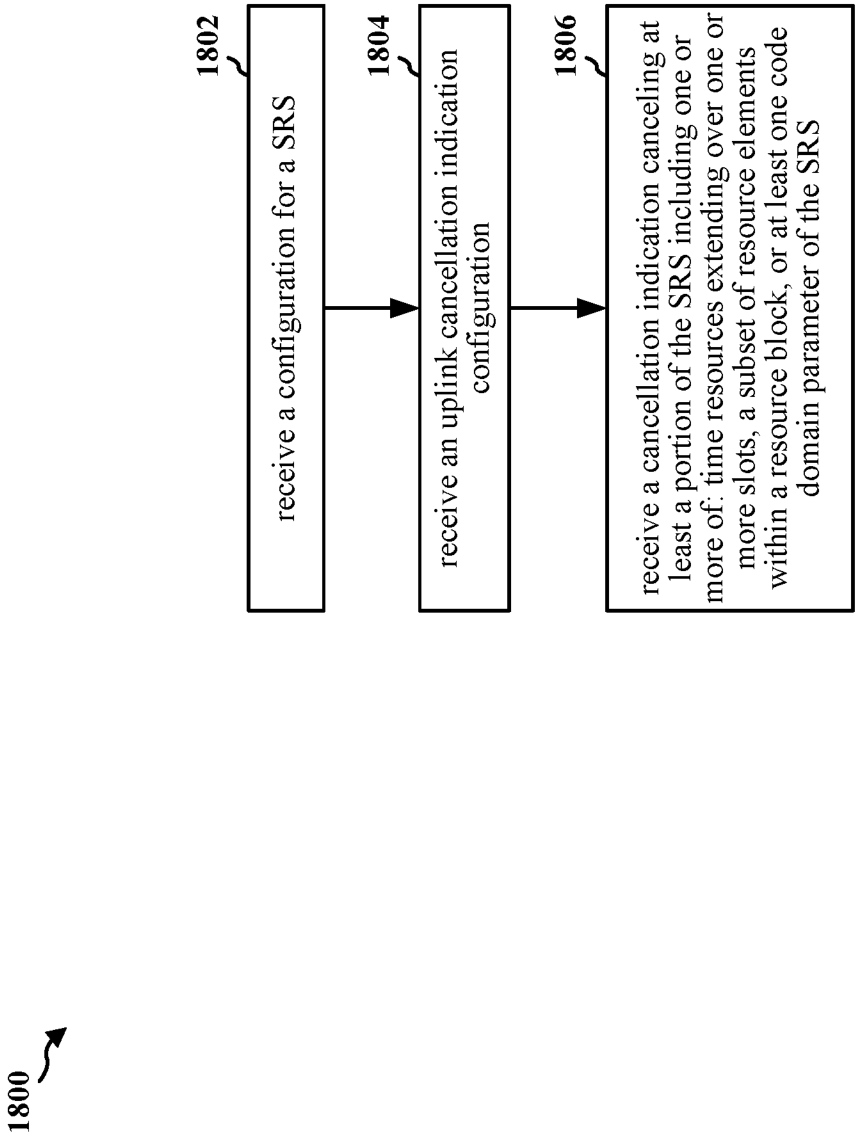
FIG. 18 is a flowchart of a method of wireless communication.

FIG. 18 is a flowchart 1800 of a method of wireless communication. The method may be performed by a UE (e.g., the UE 104, the UE 350, the UE 1702, the apparatus 2204). The method may be associated with various advantages at the UE, such as reduced transmission interference, finer granularity for ULCI across time, frequency, and code domains, and the ability to perform SRS cancellation across more than one SRS transmission occasion for semi-persistent/periodic SRSs. In an example, the method (including the various aspects described below) may be performed by the SRS muting component 198.

At 1802, the UE receives a configuration for a sounding reference signal (SRS). For example, FIG. 17 at 1710 shows that the UE 1702 may receive a configuration for a SRS. In an example, the SRS may be associated with the SRSs depicted in FIGS. 13-16.

At 1804, the UE receives an uplink cancellation indication configuration. For example, FIG. 17 at 1708 shows that the UE 1702 may receive a configuration for a ULCI. In an example, the uplink cancellation indication configuration may be or include the ULCI configuration 1102.

At 1806, the UE receives a cancellation indication canceling at least a portion of the SRS including one or more of: time resources extending over one or more slots, a subset of resource elements within a resource block, or at least one code domain parameter of the SRS. For example, FIG. 17 at 1714 shows that the UE 1702 may receive a ULCI. The ULCI may cancel at least a portion of the SRS including one or more of: time resources extending over one or more slots, a subset of resource elements within a resource block, or at least one code domain parameter of the SRS. In an example, the cancellation indication may be the ULCI 1110 that includes the indication of the time resources 1112, the indication of the subset of resource elements 1118, and the code domain parameters 1126.

In one aspect, the cancellation indication may cancel the SRS for one or more transmission occasions within a period of time spanning the one or more slots and the UE may skip transmission of the SRS within the time resources over the one or more slots. For example, FIG. 17 at 1716 shows that the UE 1702 may skip a transmission of an SRS based on the ULCI received at 1714.

In one aspect, the cancellation indication may include a parameter indicating a number of slots in which the SRS is to be canceled. For example, the indication of the time resources 1112 of the ULCI 1110 may include an indication of cancelled slots 1114 associated with the SRS.

In one aspect, a bit in a payload for the cancellation indication may correspond to at least one slot. For example, a bit in the ULCI 1110 may correspond to at least one slot.

In one aspect, the cancellation indication may include a parameter that indicates a number of symbols 1116 that is greater than 14. For example, the indication of the time resources 1112 of the ULCI 1110 may include an indication that a number of symbols 1116 is greater than 14.

In one aspect, a bit in a payload for the cancellation indication may correspond to one of: a symbol, a group of symbols, or a slot. For example, a bit in the ULCI 1110 may correspond to a symbol, a group of symbols, or a slot.

In one aspect, the one or more slots may correspond to a physical downlink control channel (PDCCH) monitoring period spanning one or more slots. For example, FIGS. 13-15 illustrate that a UE may monitor a PDCCH over a period spanning 4 slots.

In one aspect, the cancellation indication may indicate for the UE to cancel the SRS transmission in the resources of multiple slots. For example, the ULCI 1110 may indicate that a UE is to cancel an SRS transmission in resources of the cancelled slots 1114.

In one aspect, the UE may receive downlink control information (DCI) indicating to transmit the SRS before an end of the one or more slots and the UE may transmit the SRS in response to the DCI. For example, FIG. 17 at 1720 shows that the UE 1702 may receive a DCI and FIG. 17 at 1722 shows that the UE 1702 may transmit an SRS in response to the DCI.

In one aspect, the cancellation indication may cancel the SRS on the subset of REs and the UE may skip transmission of the SRS on the subset of REs. For example, FIG. 17 at 1714 shows that the ULCI may cancel an SRS on a subset of REs and FIG. 17 at 1716 shows that the UE 1702 may skip an SRS transmission on the subset of REs.

In one aspect, the cancellation indication may include a first parameter indicating a comb spacing and a second parameter indicating a comb offset for the subset of REs to be canceled. For example, the first parameter may be the comb spacing 1120 and the second parameter may be the comb offset 1122.

In one aspect, the cancellation indication may further indicate a number of resource blocks (RBs), the subset of REs being canceled within the number of RBs. For example, the ULCI 1110 may indicate RBs 1124, where the subset of REs is cancelled within the RBs 1124.

In one aspect, the subset of REs may correspond to an SRS port and the UE may skip the transmission of the SRS on at least one additional SRS port of the UE in response to the cancellation indication. For example, FIG. 15 illustrates a UE skipping transmission of an SRS on SRS ports in response to receiving a DCI format 2_4.

In one aspect, the cancellation indication may indicate the at least one code domain parameter for the SRS and the UE may transmit the SRS without the at least one code domain parameter indicated in the cancellation indication. For example, the ULCI 1110 may include code domain parameters 1126. In an example, the SRS transmitted at 1722 may be transmitted without one or more of the code domain parameters 1126.

In one aspect, the at least one code domain parameter may include a cyclic shift or a time domain orthogonal cover code (TD-OCC). For example, the at least one code domain parameter may include the cyclic shift 1128 or the TD-OCC 1130.

In one aspect, the uplink cancellation indication configuration may be included in a radio resource control (RRC) and may include at least one of a first set of one or more cyclic shift values or a second set of one or more TD-OCC sequences, where the cancellation indication may indicate the at least one of the first set of one or more cyclic shift values or the second set of one or more TD-OCC sequences from the RRC configuration. For example, the configuration for the ULCI may be transmitted at 1712 via RRC signaling. In another example, the ULCI configuration 1102 may include parameters with respect to the code domain 1108, and the parameters with respect to the code domain may include at least one of a first set of one or more cyclic shift values or a second set of one or more TD-OCC sequences. In a further example, the ULCI 1110 may indicate the cyclic shift 1128 or the TD-OCC 1130.

In one aspect, the cancellation indication may be received in a group common downlink control information (GC-DCI). For example, the GC-DCI may be the GC-DCI 1602.

Figure 19:
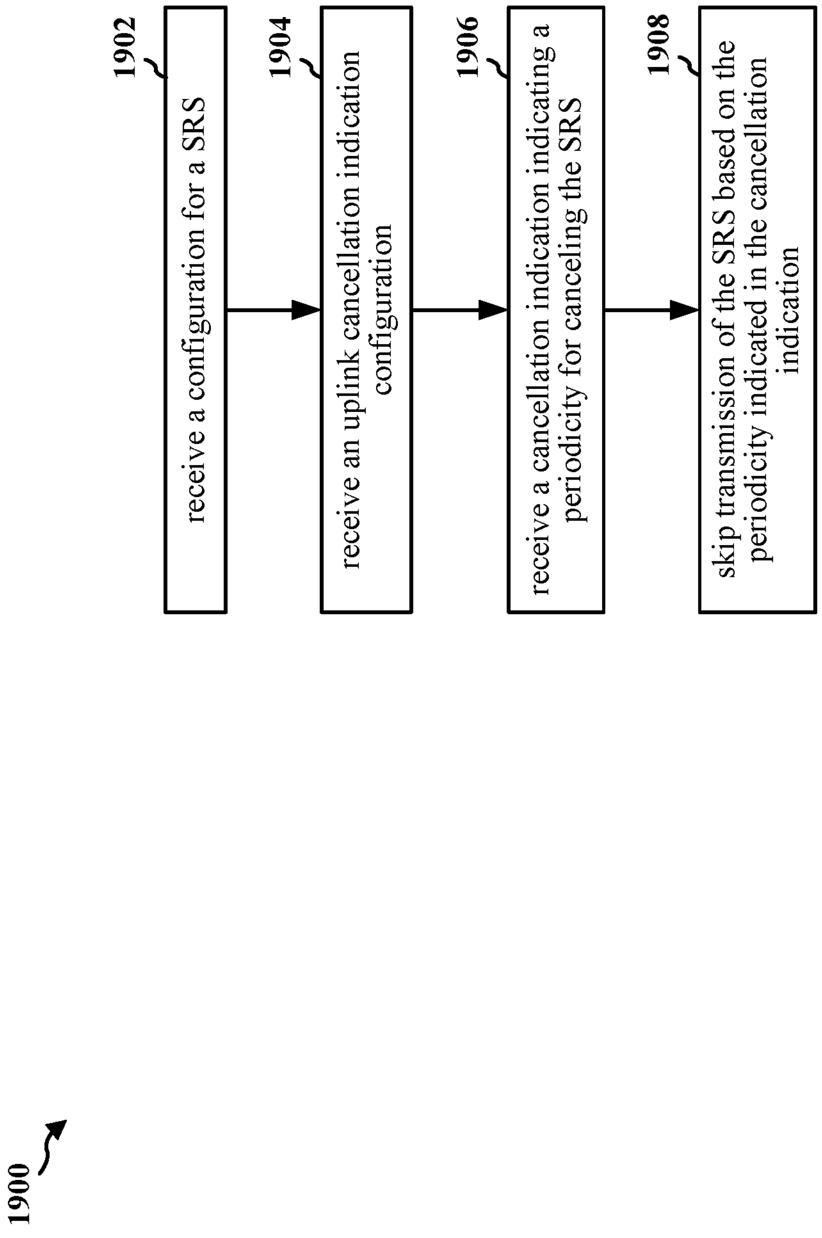
FIG. 19 is a flowchart of a method of wireless communication.

FIG. 19 is a flowchart 1900 of a method of wireless communication. The method may be performed by a UE (e.g., the UE 104, the UE 350, the UE 1702, the apparatus 2204). The method may be associated with various advantages at the UE, such as reduced transmission interference, finer granularity for ULCI across time, frequency, and code domains, and the ability to perform SRS cancellation across more than one SRS transmission occasion for semi-persistent/periodic SRSs. In an example, the method (including the various aspects described below) may be performed by the SRS muting component 198.

At 1902, the UE receives a configuration for a sounding reference signal (SRS). For example, FIG. 17 at 1710 shows that the UE 1702 may receive a configuration for a SRS.

At 1904, the UE receives an uplink cancellation indication configuration. For example, FIG. 17 at 1712 shows that the UE 1702 may receive a configuration for a ULCI. In an example, the configuration for the ULCI may be the ULCI configuration 1102.

At 1906, the UE receives a cancellation indication indicating a periodicity for canceling the SRS. For example, FIG. 17 at 1714 shows that the UE 1702 may receive a ULCI. The ULCI may indicate a periodicity for cancelling a SRS. In an example, the cancellation indication indicating the periodicity for canceling the SRS may be the ULCI 1110.

At 1908, the UE skips transmission of the SRS based on the periodicity indicated in the cancellation indication. For example, FIG. 17 at 1716 shows that the UE 1702 may skip an SRS transmission based on the ULCI received at 1714.

In one aspect, the cancellation indication may be received in a group common downlink control information (GC-DCI). For example, the GC-DCI may be the GC-DCI 1602.

In one aspect, the UE may receive additional control signaling indicating for the UE to resume SRS transmissions at occasions canceled by the cancellation indication and transmit the SRS transmissions in response to the additional control signaling. For example, FIG. 17 at 1720 shows that the UE 1702 may receive additional control signaling indicating that the UE is to resume SRS transmissions at occasions canceled by the ULCI and FIG. 17 at 1722 shows that the UE 1702 may transmit an SRS in response to receiving the additional control signaling at 1720.

Figure 20:
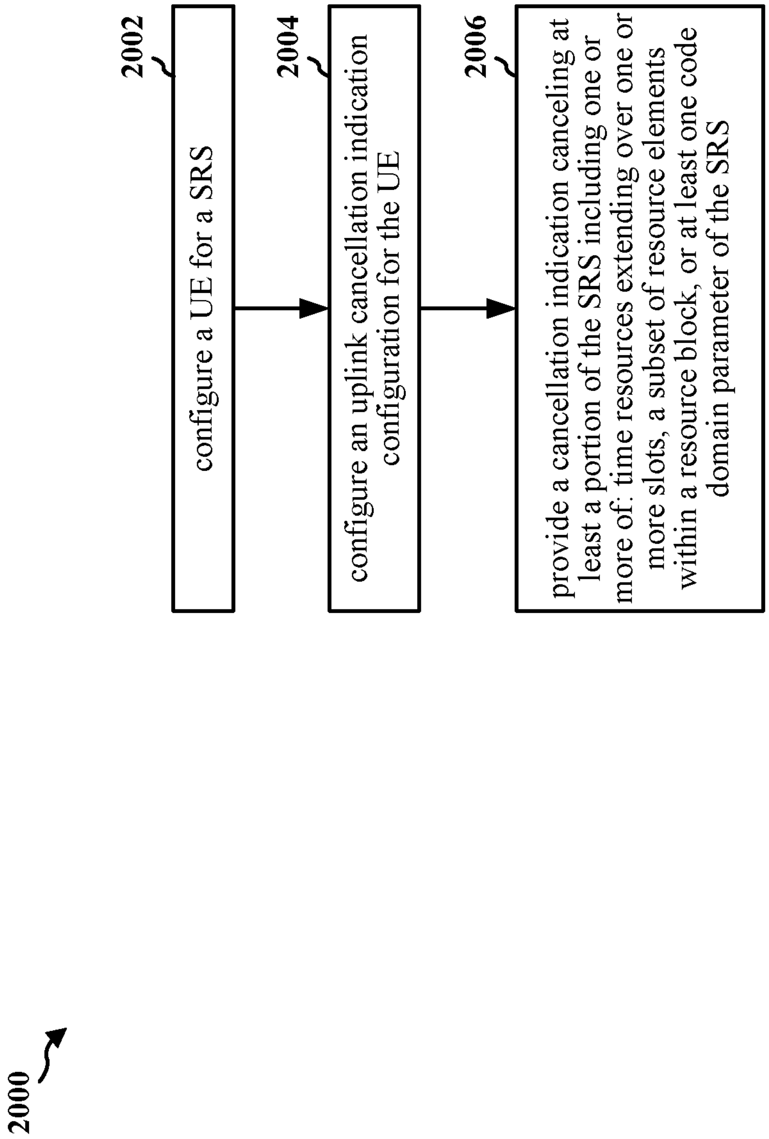
FIG. 20 is a flowchart of a method of wireless communication.

FIG. 20 is a flowchart 2000 of a method of wireless communication. The method may be performed by a network node (e.g., the base station 102, the base station 310, the base station 1704, the network entity 2302). The method may be associated with various advantages at the network node, such as increased communications reliability with UEs. In an example, the method (including the various aspects described below) may be performed by the SRS ULCI component 199.

At 2002, the network node configures a user equipment (UE) for a sounding reference signal (SRS). For example, FIG. 17 at 1706 shows that the base station 1704 may configure a SRS for the UE 1702.

At 2004, the network node configures an uplink cancellation indication configuration for the UE. For example, FIG. 17 at 1708 shows that the base station 1704 may configure a ULCI for the UE 1702. In an example, the uplink cancellation indication configuration may be the ULCI configuration 1102.

At 2006, the network node provides a cancellation indication canceling at least a portion of the SRS including one or more of: time resources extending over one or more slots, a subset of resource elements within a resource block, or at least one code domain parameter of the SRS. For example, FIG. 17 at 1714 shows that the base station 1704 may transmit a ULCI that cancels at least a portion of the SRS including one or more of: time resources extending over one or more slots, a subset of resource elements within a resource block, or at least one code domain parameter of the SRS. In an example, the cancellation indication may be the ULCI 1110 that includes the indication of the time resources 1112, the indication of the subset of resource elements 1118, and the code domain parameters 1126.

In one aspect, the cancellation indication may cancel the SRS for one or more transmission occasions within the period of time spanning the one or more slots and the network node may skip reception of the SRS within the time resources over the one or more slots. For example, FIG. 17 at 1718 shows that the base station 1704 may skip reception of an SRS based on the ULCI transmitted at 1714.

In one aspect, the network node may provide downlink control information (DCI) indicating to resume the SRS before an end of the one or more slots and the network node may receive the SRS in response to the DCI. For example, FIG. 17 at 1720 shows that the base station 1704 may transmit a DCI indicating that the UE 1702 is to resume the SRS before an end of the one or more slots and FIG. 17 at 1722 shows that the base station 1704 may receive a SRS in response to transmitting the DCI at 1720.

In one aspect, the cancellation indication may cancel the SRS on the subset of REs and the network node may skip reception of the SRS on the subset of REs. For example, the ULCI transmitted at 1714 may cancel the SRS on the subset of REs and at 1722 the base station 1704 may skip reception of the SRS on the subset of REs. In an example, the subset of REs may be or include REs depicted in FIGS. 14-15.

In one aspect, the cancellation indication may indicate the at least one code domain parameter for the SRS and the network node may receive the SRS without the at least one code domain parameter indicated in the cancellation indication. For example, the at least one code domain parameter may be included in the code domain parameters 1126. In another example, the SRS received at 1722 may be received by the base station 1704 without the at least one code domain parameter indicated in the cancellation indication.

In one aspect, the at least one code domain parameter may include a cyclic shift or a time domain orthogonal cover code (TD-OCC). For example, the at least one code domain parameter may include the cyclic shift 1128 or the TD-OCC 1130.

In one aspect, the uplink cancellation indication configuration may be included in a radio resource control (RRC) configuration and may include at least one of a first set of one or more cyclic shift values or a second set of one or more TD-OCC sequences, where the cancellation indication indicates the at least one of the first set of one or more cyclic shift values or the second set of one or more TD-OCC sequences from the RRC configuration. For example, the ULCI transmitted at 1714 may be included in RRC signaling. In an example, the ULCI may include the cyclic shift 1128 or the TD-OCC 1130.

In one aspect, the cancellation indication may be included in a group common downlink control information (GC-DCI). For example, the GC-DCI may be or include the GC-DCI 1602.

Figure 21:
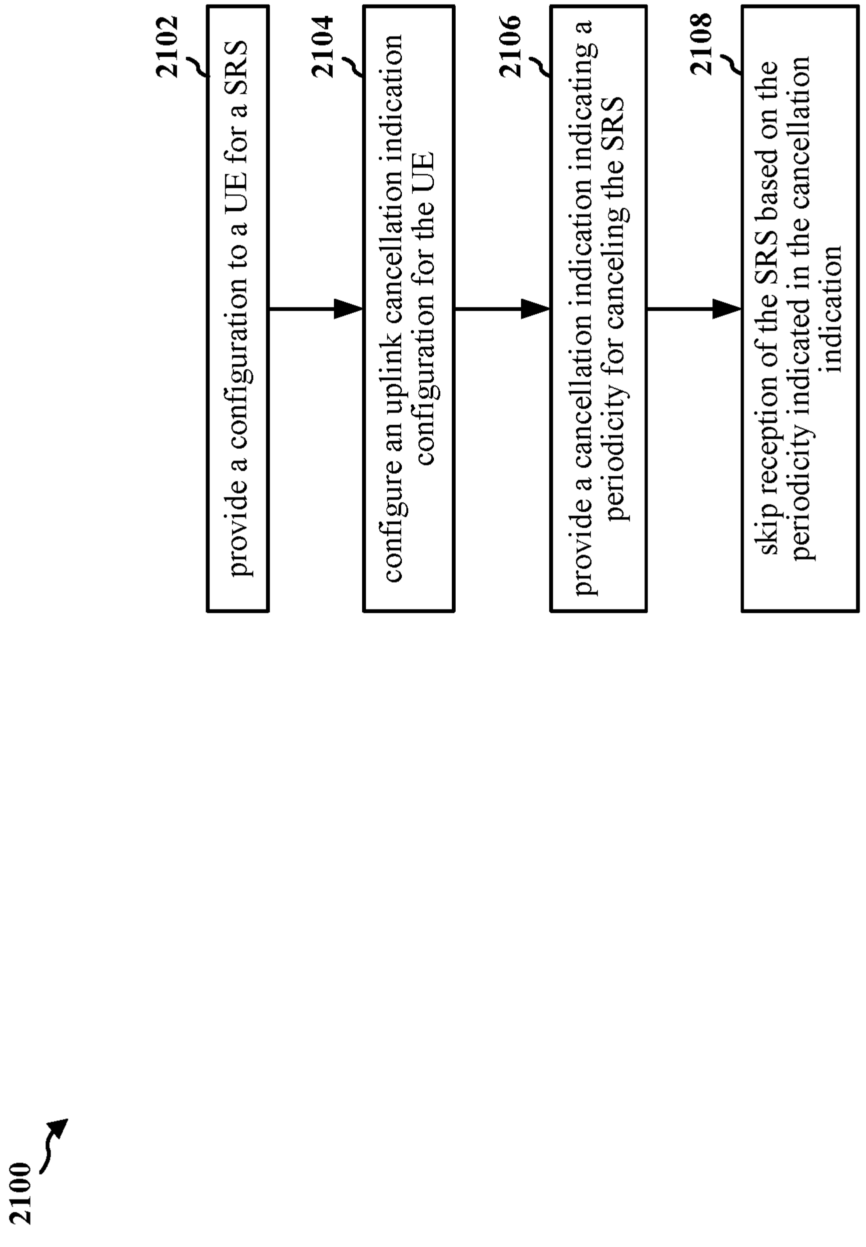
FIG. 21 is a flowchart of a method of wireless communication.

FIG. 21 is a flowchart 2100 of a method of wireless communication. The method may be performed by a network node (e.g., the base station 102, the base station 310, the base station 1704, the network entity 2302). The method may be associated with various advantages at the network node, such as increased communications reliability with UEs. In an example, the method (including the various aspects described below) may be performed by the SRS ULCI component 199.

At 2102, the network node provides a configuration to a user equipment (UE) for a sounding reference signal (SRS). For example, FIG. 17 at 1710 shows that the base station 1704 may transmit a configuration for a SRS to the UE 1702.

At 2104, the network node configures an uplink cancellation indication configuration for the UE. For example, FIG. 17 at 1708 shows that the base station 1704 may configure a ULCI for the UE 1702 and FIG. 17 at 1712 shows that the base station may transmit a configuration for the ULCI to the UE 1702. In an example, the uplink cancellation indication configuration may be the ULCI configuration 1102.

At 2106, the network node provides a cancellation indication indicating a periodicity for canceling the SRS. For example, FIG. 17 at 1714 shows that the base station 1704 may transmit a ULCI to the UE 1702. The ULCI may indicate a periodicity for cancelling an SRS.

At 2108, the network node skips reception of the SRS based on the periodicity indicated in the cancellation indication. For example, FIG. 17 at 1718 shows that the base station 1704 may skip SRS reception at 1718 based on the ULCI transmitted at 1714.

In one aspect, the network node may provide additional control signaling indicating for the UE to resume SRS transmissions at occasions canceled by the cancellation indication and the network node may receive the SRS transmissions in response to the additional control signaling. For example, FIG. 17 at 1720 shows that the base station 1704 may transmit additional control signaling indicating for the UE to resume SRS transmissions at occasions canceled by the cancellation indication and FIG. 17 at 1722 shows that the network node, e.g., base station 1704, may receive a SRS transmission in response to the additional control signaling transmitted at 1720.

Figure 22:
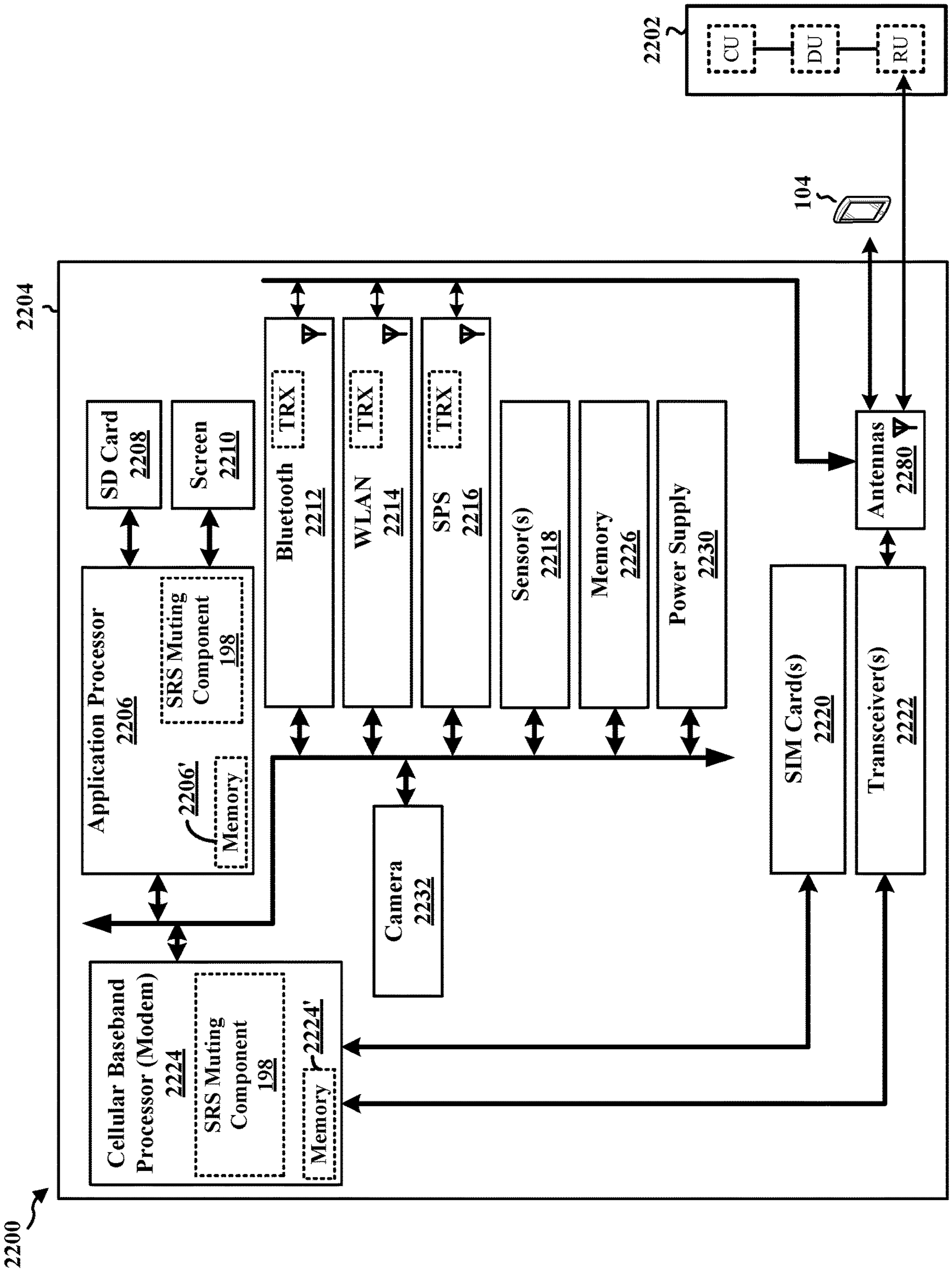
FIG. 22 is a diagram illustrating an example of a hardware implementation for an example apparatus and/or UE.

FIG. 22 is a diagram 2200 illustrating an example of a hardware implementation for an apparatus 2204. The apparatus 2204 may be a UE, a component of a UE, or may implement UE functionality. In some aspects, the apparatus 2204 may include at least one cellular baseband processor 2224 (also referred to as a modem) coupled to one or more transceivers 2222 (e.g., cellular RF transceiver). The cellular baseband processor(s) 2224 may include at least one on-chip memory 2224'. In some aspects, the apparatus 2204 may further include one or more subscriber identity modules (SIM) cards 2220 and at least one application processor 2206 coupled to a secure digital (SD) card 2208 and a screen 2210. The application processor(s) 2206 may include on-chip memory 2206'. In some aspects, the apparatus 2204 may further include a Bluetooth module 2212, a WLAN module 2214, an SPS module 2216 (e.g., GNSS module), one or more sensor modules 2218 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 2226, a power supply 2230, and/or a camera 2232. The Bluetooth module 2212, the WLAN module 2214, and the SPS module 2216 may include an on-chip transceiver (TRX) (or in some cases, just a receiver (RX)). The Bluetooth module 2212, the WLAN module 2214, and the SPS module 2216 may include their own dedicated antennas and/or utilize one or more antennas 2280 for communication. The cellular baseband processor(s) 2224 communicates through the transceiver(s) 2222 via the one or more antennas 2280 with the UE 104 and/or with an RU associated with a network entity 2202. The cellular baseband processor(s) 2224 and the application processor(s) 2206 may each include a computer-readable medium/memory 2224', 2206', respectively. The additional memory modules 2226 may also be considered a computer-readable medium/memory. Each computer-readable medium/memory 2224', 2206', 2226 may be non-transitory. The cellular baseband processor(s) 2224 and the application processor(s) 2206 are each responsible for general processing, including the execution of software stored on the computer-readable medium/memory. The software, when executed by the cellular baseband processor(s) 2224/application processor(s) 2206, causes the cellular baseband processor(s) 2224/application processor(s) 2206 to perform the various functions described supra. The cellular baseband processor(s) 2224 and the application processor(s) 2206 are configured to perform the various functions described supra based at least in part of the information stored in the memory. That is, the cellular baseband processor(s) 2224 and the application processor(s) 2206 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 2224/application processor(s) 2206 when executing software. The cellular baseband processor(s) 2224/application processor(s) 2206 may be a component of the UE 350 and may include the at least one memory 360 and/or at least one of the TX processor 368, the RX processor 356, and the controller/processor 359. In one configuration, the apparatus 2204 may be at least one processor chip (modem and/or application) and include just the cellular baseband processor(s) 2224 and/or the application processor(s) 2206, and in another configuration, the apparatus 2204 may be the entire UE (e.g., see UE 350 of FIG. 3) and include the additional modules of the apparatus 2204.

As discussed supra, the SRS muting component 198 may be configured to receive a configuration for an SRS, receive an uplink cancellation indication configuration, and receive a cancellation indication canceling at least a portion of the SRS including one or more of: time resources extending over one or more slots, a subset of resource elements within a resource block, or at least one code domain parameter of the SRS. In some aspects, the SRS muting component 198 may be configured to receive a configuration for an SRS, receive an uplink cancellation indication configuration, receive a cancellation indication indicating a periodicity for canceling the SRS, and skip transmission of the SRS based on the periodicity indicated in the cancellation indication. The SRS muting component may be further configured to perform any of the aspects described in connection with FIG. 18, FIG. 19, and or performed by the UE in FIG. 17. The SRS muting component 198 may be within the cellular baseband processor(s) 2224, the application processor(s) 2206, or both the cellular baseband processor(s) 2224 and the application processor(s) 2206. The SRS muting component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 2204 may include a variety of components configured for various functions. In one configuration, the apparatus 2204, and in particular the cellular baseband processor(s) 2224 and/or the application processor(s) 2206, includes means for receiving a configuration for an SRS, means for receiving an uplink cancellation indication configuration, and means for receiving a cancellation indication canceling at least a portion of the SRS including one or more of: time resources extending over one or more slots, a subset of resource elements within a resource block, or at least one code domain parameter of the SRS. In some aspects, the apparatus 2204, and in particular the cellular baseband processor(s) 2224 and/or the application processor(s) 2206, includes means for receiving a configuration for an SRS, means for receiving an uplink cancellation indication configuration, means for receiving a cancellation indication indicating a periodicity for canceling the SRS, and means for skipping transmission of the SRS based on the periodicity indicated in the cancellation indication. In some aspects, the apparatus 2204, and in particular the cellular baseband processor(s) 2224 and/or the application processor(s) 2206, includes means for skipping transmission of the SRS within the time resources over the one or more slots. In some aspects, the apparatus 2204, and in particular the cellular baseband processor(s) 2224 and/or the application processor(s) 2206, includes means for receiving DCI indicating to transmit the SRS before an end of the one or more slots. In some aspects, the apparatus 2204, and in particular the cellular baseband processor(s) 2224 and/or the application processor(s) 2206, includes means for transmitting the SRS in response to the DCI. In some aspects, the apparatus 2204, and in particular the cellular baseband processor(s) 2224 and/or the application processor(s) 2206, includes means for skipping transmission of the SRS on the subset of resource elements. In some aspects, the apparatus 2204, and in particular the cellular baseband processor(s) 2224 and/or the application processor(s) 2206, includes means for skipping the transmission of the SRS on at least one additional SRS port of the UE in response to the cancellation indication. In some aspects, the apparatus 2204, and in particular the cellular baseband processor(s) 2224 and/or the application processor(s) 2206, includes means for transmitting the SRS without the at least one code domain parameter indicated in the cancellation indication. In some aspects, the apparatus 2204, and in particular the cellular baseband processor(s) 2224 and/or the application processor(s) 2206, includes means for receiving additional control signaling indicating for the UE to resume SRS transmissions at occasions canceled by the cancellation indication. In some aspects, the apparatus 2204, and in particular the cellular baseband processor(s) 2224 and/or the application processor(s) 2206, includes means for transmitting the SRS transmissions in response to the additional control signaling.

The apparatus may further include means for performing any of the aspects described in connection with FIG. 18, FIG. 19, and or performed by the UE in FIG. 17. The means may be the SRS muting component 198 of the apparatus 2204 configured to perform the functions recited by the means. As described supra, the apparatus 2204 may include the TX processor 368, the RX processor 356, and the controller/processor 359. As such, in one configuration, the means may be the TX processor 368, the RX processor 356, and/or the controller/processor 359 configured to perform the functions recited by the means or as described in relation to FIGS. 18 and 19.

Figure 23:
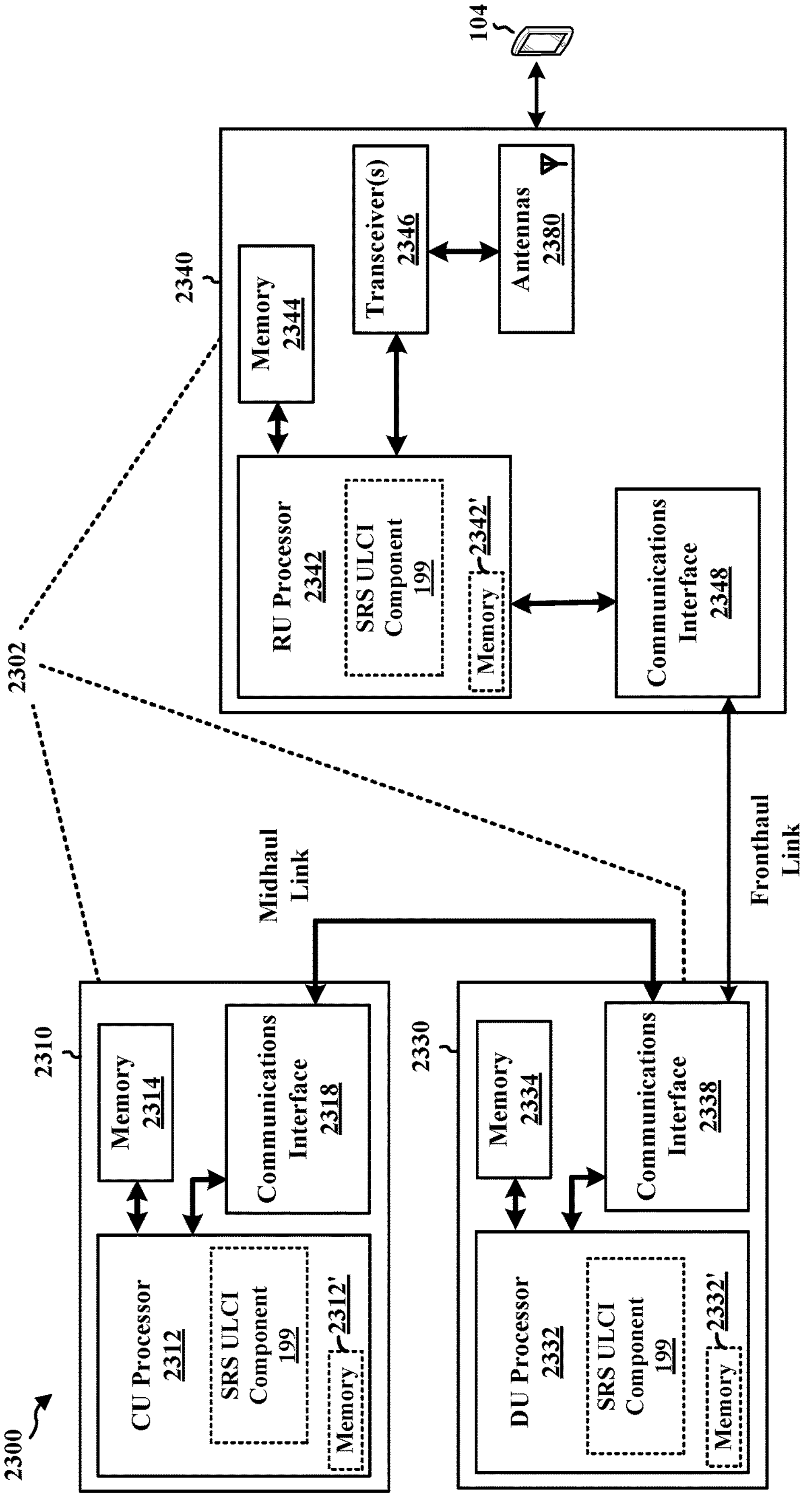
FIG. 23 is a diagram illustrating an example of a hardware implementation for an example network entity.

FIG. 23 is a diagram 2300 illustrating an example of a hardware implementation for a network entity 2302. The network entity 2302 may be a BS, a component of a BS, or may implement BS functionality. The network entity 2302 may include at least one of a CU 2310, a DU 2330, or an RU 2340. For example, depending on the layer functionality handled by the SRS ULCI component 199, the network entity 2302 may include the CU 2310; both the CU 2310 and the DU 2330; each of the CU 2310, the DU 2330, and the RU 2340; the DU 2330; both the DU 2330 and the RU 2340; or the RU 2340. The CU 2310 may include at least one CU processor 2312. The CU processor(s) 2312 may include on-chip memory 2312'. In some aspects, the CU 2310 may further include additional memory modules 2314 and a communications interface 2318. The CU 2310 communicates with the DU 2330 through a midhaul link, such as an F1 interface. The DU 2330 may include at least one DU processor 2332. The DU processor(s) 2332 may include on-chip memory 2332'. In some aspects, the DU 2330 may further include additional memory modules 2334 and a communications interface 2338. The DU 2330 communicates with the RU 2340 through a fronthaul link. The RU 2340 may include at least one RU processor 2342. The RU processor(s) 2342 may include on-chip memory 2342'. In some aspects, the RU 2340 may further include additional memory modules 2344, one or more transceivers 2346, one or more antennas 2380, and a communications interface 2348. The RU 2340 communicates with the UE 104. The on-chip memory 2312', 2332', 2342' and the additional memory modules 2314, 2334, 2344 may each be considered a computer-readable medium/memory. Each computer-readable medium/memory may be non-transitory. Each of the processors 2312, 2332, 2342 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the SRS ULCI component 199 may be configured to configure a UE for an SRS; configure an uplink cancellation indication configuration for the UE; provide a cancellation indication canceling at least a portion of the SRS including one or more of: time resources extending over one or more slots, a subset of resource elements within a resource block, or at least one code domain parameter of the SRS. In some aspects, the SRS ULCI component may be further configured to provide a configuration to a UE for an SRS; configure an uplink cancellation indication configuration for the UE; provide a cancellation indication indicating a periodicity for canceling the SRS; and skip reception of the SRS based on the periodicity indicated in the cancellation indication. The SRS ULCI component 199 may be further configured to perform any of the aspects described in connection with FIG. 20, FIG. 21, and/or the aspects performed by the base station in FIG. 17. The SRS ULCI component 199 may be within one or more processors of one or more of the CU 2310, DU 2330, and the RU 2340. The SRS ULCI component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 2302 may include a variety of components configured for various functions. In one configuration, the network entity 2302 includes means for configuring a UE for a SRS. The network entity 2302, in some aspects, may include means for configuring an uplink cancellation indication configuration for the UE. The network entity 2302, in some aspects, may include means for providing a cancellation indication canceling at least a portion of the SRS including one or more of: time resources extending over one or more slots, a subset of resource elements within a resource block, or at least one code domain parameter of the SRS. In some aspects, the network entity may include means for providing a configuration to a UE for an SRS. The network entity 2302, in some aspects, may include means for configuring an uplink cancellation indication configuration for the UE. The network entity 2302, in some aspects, may include means for providing a cancellation indication indicating a periodicity for canceling the SRS. The network entity 2302, in some aspects, may include means for skipping reception of the SRS based on the periodicity indicated in the cancellation indication. The network entity 2302, in some aspects, may include means for skipping reception of the SRS within the time resources over the one or more slots. The network entity 2302, in some aspects, may include means for providing DCI indicating to resume the SRS before an end of the one or more slots. The network entity 2302, in some aspects, may include means for receiving the SRS in response to the DCI. The network entity 2302, in some aspects, may include means for skipping reception of the SRS on the subset of resource elements. The network entity 2302, in some aspects, may include means for receiving the SRS without the at least one code domain parameter indicated in the cancellation indication. The network entity 2302, in some aspects, may include means for providing additional control signaling indicating for the UE to resume SRS transmissions at occasions canceled by the cancellation indication. The network entity 2302, in some aspects, may include means for receive the SRS transmissions in response to the additional control signaling. The network entity may further include means for performing any of the aspects described in connection with FIG. 20, FIG. 21, and/or the aspects performed by the base station in FIG. 17. The means may be the SRS ULCI component 199 of the network entity 2302 configured to perform the functions recited by the means. As described supra, the network entity 2302 may include the TX processor 316, the RX processor 370, and the controller/processor 375. As such, in one configuration, the means may be the TX processor 316, the RX processor 370, and/or the controller/processor 375 configured to perform the functions recited by the means or as described in relation to FIGS. 20 and 21.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a user equipment (UE), including: receiving a configuration for a sounding reference signal (SRS); receiving an uplink cancellation indication configuration; and receiving a cancellation indication canceling at least a portion of the SRS including one or more of: time resources extending over one or more slots, a subset of resource elements within a resource block, or at least one code domain parameter of the SRS.

Aspect 2 is the method of aspect 1, where the cancellation indication cancels the SRS for one or more transmission occasions within a period of time spanning the one or more slots, the method further including: skipping transmission of the SRS within the time resources over the one or more slots Aspect 3 is the method of aspect 2, where the cancellation indication includes a parameter indicating a number of slots in which the SRS is to be canceled.

Aspect 4 is the method of aspect 3, where a bit in a payload for the cancellation indication corresponds to at least one slot.

Aspect 5 is the method of any of aspects 2-4, where the cancellation indication includes a parameter that indicates a number of symbols that is greater than 14.

Aspect 6 is the method of aspect 5, where a bit in a payload for the cancellation indication corresponds to one of: a symbol, a group of symbols, or a slot.

Aspect 7 is the method of any of aspects 2-6, where the one or more slots corresponds to a PDCCH monitoring period spanning one or more slots.

Aspect 8 is the method of any of aspects 2-7, where the cancellation indication indicates for the UE to cancel the SRS transmission in the resources of multiple slots.

Aspect 9 is the method of any of aspects 2-8, further including: receiving DCI indicating to transmit the SRS before an end of the one or more slots; and transmitting the SRS in response to the DCI.

Aspect 10 is the method of any of aspects 1-9, where the cancellation indication cancels the SRS on the subset of REs; and skipping transmission of the SRS on the subset of REs.

Aspect 11 is the method of aspect 10, where the cancellation indication includes a first parameter indicating a comb spacing and a second parameter indicating a comb offset for the subset of REs to be canceled.

Aspect 12 is the method of any of aspects 10-11, where the cancellation indication further indicates a number of RBs, the subset of REs being canceled within the number of RBs.

Aspect 13 is the method of any of aspects 10-12, where the subset of REs corresponds to an SRS port, the method further including: skipping the transmission of the SRS on at least one additional SRS port of the UE in response to the cancellation indication.

Aspect 14 is the method of aspect any of aspects 1-13, where the cancellation indication indicates the at least one code domain parameter for the SRS, the method further including: transmitting the SRS without the at least one code domain parameter indicated in the cancellation indication.

Aspect 15 is the method of aspect 14, where the at least one code domain parameter includes a cyclic shift or a TD-OCC.

Aspect 16 is the method of aspect 15, where the uplink cancellation indication configuration is included in a RRC and includes at least one of a first set of one or more cyclic shift values or a second set of one or more TD-OCC sequences, where the cancellation indication indicates the at least one of the first set of one or more cyclic shift values or the second set of one or more TD-OCC sequences from the RRC configuration.

Aspect 17 is the method of any of aspects 1-16, where the cancellation indication is received in a GC-DCI.

Aspect 18 is an apparatus for wireless communication at a UE including at least one memory and at least one processor coupled to the at least one memory and based at least in part on information stored in the memory, the at least one processor, individually or in any combination, is configured to cause the UE to perform a method in accordance with any of aspects 1-17.

Aspect 19 is an apparatus for wireless communications, including means for performing a method in accordance with any of aspects 1-17.

Aspect 20 is an apparatus for wireless communication at a UE including one or more memories and one or more processors coupled to the one or more memories, the one or more processors configured, individually or in any combination, to cause the UE to perform a method in accordance with any of aspects 1-17.

Aspect 21 is the apparatus of aspect 18, 19, or 20 further comprising a transceiver configured to receive or to transmit in association with the method of any of aspects 1-17.

Aspect 22 is the apparatus of aspect 18 or 19 further including at least one of a transceiver or an antenna coupled to the at least one processor, where the at least one processor is configured to receive the configuration, receive the uplink cancellation indication configuration, and receive the cancellation indication via at least one of the transceiver or the antenna.

Aspect 23 is a computer-readable medium (e.g., a non-transitory computer-readable medium) including instructions that, when executed by an apparatus, cause the apparatus to perform a method in accordance with any of aspects 1-17.

Aspect 24 is a computer-readable medium storing computer executable code at a UE, the code when executed by at least one processor causes the UE to perform the method of any of aspects 1-17.

Aspect 25 is a method of wireless communication at a UE, including: receiving a configuration for a SRS; receiving an uplink cancellation indication configuration; receiving a cancellation indication indicating a periodicity for canceling the SRS; and skipping transmission of the SRS based on the periodicity indicated in the cancellation indication.

Aspect 26 is the method of aspect 25, where the cancellation indication is received in a GC-DCI.

Aspect 27 is the method of any of aspects 25-26, further including: receiving additional control signaling indicating for the UE to resume SRS transmissions at occasions canceled by the cancellation indication; and transmitting the SRS transmissions in response to the additional control signaling.

Aspect 28 is an apparatus for wireless communication at a UE including at least one memory and at least one processor coupled to the at least one memory and based at least in part on information stored in the at least one memory, the at least one processor, individually or in any combination, is configured to cause the UE to perform a method in accordance with any of aspects 25-27.

Aspect 29 is an apparatus for wireless communications, including means for performing a method in accordance with any of aspects 25-27.

Aspect 30 is an apparatus for wireless communication at a UE including one or more memories and one or more processors coupled to the one or more memories, the one or more processors configured, individually or in any combination, to cause the UE to perform a method in accordance with any of aspects 25-27.

Aspect 31 is the apparatus of aspect 28, 29, or 30 further including at least one of a transceiver or an antenna coupled to the at least one processor, where the at least one processor is configured to receive the configuration, receive the uplink cancellation indication configuration, and receive the cancellation indication via at least one of the transceiver or the antenna.

Aspect 32 is the apparatus of aspect 28, 29, or 30 further comprising a transceiver configured to receive or to transmit in association with the method of any of aspects 25-27.

Aspect 33 is a computer-readable medium (e.g., a non-transitory computer-readable medium) including instructions that, when executed by an apparatus, cause the apparatus to perform a method in accordance with any of aspects 25-27.

Aspect 34 is a computer-readable medium storing computer executable code at a UE, the code when executed by at least one processor causes the UE to perform the method of any of aspects 25-27.

Aspect 35 is a method of wireless communication at a network node, including: configuring a UE for a SRS; and configuring an uplink cancellation indication configuration for the UE; providing a cancellation indication canceling at least a portion of the SRS including one or more of: time resources extending over one or more slots, a subset of resource elements within a resource block, or at least one code domain parameter of the SRS.

Aspect 36 is the method of aspect 35, where the cancellation indication cancels the SRS for one or more transmission occasions within the period of time spanning the one or more slots, the method further including: skipping reception of the SRS within the time resources over the one or more slots.

Aspect 37 is the method of aspect 36, further including: providing DCI indicating to resume the SRS before an end of the one or more slots; and receiving the SRS in response to the DCI.

Aspect 38 is the method of any of aspects 35-37, where the cancellation indication cancels the SRS on the subset of REs, the method further including: skipping reception of the SRS on the subset of REs.

Aspect 39 is the method of any of aspects 35-38, where the cancellation indication indicates the at least one code domain parameter for the SRS, the method further including: receiving the SRS without the at least one code domain parameter indicated in the cancellation indication.

Aspect 40 is the method of aspect 39, where the at least one code domain parameter includes a cyclic shift or a TD-OCC.

Aspect 41 is the method of aspect 40, where the uplink cancellation indication is included in a RRC configuration and includes at least one of a first set of one or more cyclic shift values or a second set of one or more TD-OCC sequences, where the cancellation indication indicates the at least one of the first set of one or more cyclic shift values or the second set of one or more TD-OCC sequences from the RRC configuration.

Aspect 42 is the method of any of aspects 35-41, where the cancellation indication is included in a GC-DCI.

Aspect 43 is an apparatus for wireless communication at a network node including at least one memory and at least one processor coupled to the at least one memory and based at least in part on information stored in the at least one memory, the at least one processor, individually or in any combination, is configured to cause the network node to perform a method in accordance with any of aspects 35-42.

Aspect 44 is an apparatus for wireless communications, including means for performing a method in accordance with any of aspects 35-42.

Aspect 45 is an apparatus for wireless communication at a network node including one or more memories and one or more processors coupled to the one or more memories, the one or more processors configured, individually or in any combination, to cause the network node to perform a method in accordance with any of aspects 35-42.

Aspect 46 is the apparatus of aspect 43, 44, or 45 further including at least one of a transceiver or an antenna coupled to the at least one processor, where the at least one processor is configured to provide the cancellation indication via at least one of the transceiver or the antenna.

Aspect 47 is the apparatus of aspect 43, 44, or 45 further comprising a transceiver configured to receive or to transmit in association with the method of any of aspects 35-42.

Aspect 48 is a computer-readable medium (e.g., a non-transitory computer-readable medium) including instructions that, when executed by an apparatus, cause the apparatus to perform a method in accordance with any of aspects 35-42.

Aspect 49 is a computer-readable medium storing computer executable code at a network node, the code when executed by at least one processor causes the network node to perform the method of any of aspects 35-42.

Aspect 50 is a method of wireless communication at a network node, including: providing a configuration to a UE for a SRS; configuring an uplink cancellation indication configuration for the UE; providing a cancellation indication indicating a periodicity for canceling the SRS; and skipping reception of the SRS based on the periodicity indicated in the cancellation indication.

Aspect 51 is the method of aspect 50, further including: providing additional control signaling indicating for the UE to resume SRS transmissions at occasions canceled by the cancellation indication; and receiving the SRS transmissions in response to the additional control signaling.

Aspect 52 is an apparatus for wireless communication at a network node including at least one memory and at least one processor coupled to the at least one memory and based at least in part on information stored in the at least one memory, the at least one processor, individually or in any combination, is configured to cause the network node to perform a method in accordance with any of aspects 50-51.

Aspect 53 is an apparatus for wireless communications, including means for performing a method in accordance with any of aspects 50-51.

Aspect 54 is an apparatus for wireless communication at a network node including one or more memories and one or more processors coupled to the one or more memories, the one or more processors configured, individually or in any combination, to cause the network node to perform a method in accordance with any of aspects 50-51.

Aspect 55 is the apparatus of aspect 52, 53, or 54 further including at least one of a transceiver or an antenna coupled to the at least one processor, where the at least one processor is configured to provide the configuration and provide the cancellation indication via at least one of the transceiver or the antenna.

Aspect 56 is the apparatus of aspect 52, 53, or 54 further comprising a transceiver configured to receive or to transmit in association with the method of any of aspects 50-51.

Aspect 57 is a computer-readable medium (e.g., a non-transitory computer-readable medium) including instructions that, when executed by an apparatus, cause the apparatus to perform a method in accordance with any of aspects 50-51.

Aspect 58 is a computer-readable medium storing computer executable code at a network node, the code when executed by at least one processor causes the network node to perform the method of any of aspects 50-51.

The invention claimed is:

1. An apparatus for wireless communication at a user equipment (UE), comprising:

at least one memory; and at least one processor coupled to the at least one memory and, based at least in part on information stored in the at least one memory, the at least one processor is configured to cause the UE to:

receive a configuration for a sounding reference signal (SRS);

receive an uplink cancellation indication configuration; and receive a cancellation indication canceling at least a portion of the SRS including one or more of:

time resources extending over one or more slots, a subset of resource elements within a resource block, or at least one code domain parameter of the SRS.

2. The apparatus of claim 1, wherein the cancellation indication cancels the SRS for a plurality of transmission occasions within a period of time spanning the one or more slots, wherein the at least one processor is further configured to cause the UE to:

skip transmission of the SRS within the time resources over the one or more slots.

3. The apparatus of claim 2, wherein the cancellation indication comprises a parameter indicating a number of slots in which the SRS is to be canceled.

4. The apparatus of claim 3, wherein a bit in a payload for the cancellation indication corresponds to at least one slot.

5. The apparatus of claim 2, wherein the cancellation indication comprises a parameter that indicates a number of symbols that is greater than 14.

6. The apparatus of claim 5, wherein a bit in a payload for the cancellation indication corresponds to one of:

a symbol, a group of symbols, or a slot.

7. The apparatus of claim 2, wherein the one or more slots corresponds to a physical downlink control channel (PDCCH) monitoring period spanning the one or more slots.

8. The apparatus of claim 2, wherein the cancellation indication indicates for the UE to cancel the transmission of the SRS in the time resources of multiple slots.

9. The apparatus of claim 2, wherein the UE further comprises at least one of a transceiver or an antenna coupled to the at least one processor, wherein the at least one processor is configured to receive the cancellation indication via at least one of the transceiver or the antenna, wherein the at least one processor is, individually or in combination, further configured to cause the UE to:

receive downlink control information (DCI) indicating to transmit the SRS before an end of the one or more slots; and transmit the SRS in response to the DCI.

10. The apparatus of claim 1, wherein the cancellation indication cancels the SRS on the subset of resource elements, wherein the at least one processor is further configured to cause the UE to:

skip transmission of the SRS on the subset of resource elements.

11. The apparatus of claim 10, wherein the cancellation indication includes a first parameter indicating a comb spacing and a second parameter indicating a comb offset for the subset of resource elements to be canceled.

12. The apparatus of claim 10, wherein the cancellation indication further indicates a number of resource blocks (RBs), the subset of resource elements being canceled within the number of RBs.

13. The apparatus of claim 10, wherein the subset of resource elements corresponds to an SRS port, wherein the at least one processor is further configured to cause the UE to:

skip the transmission of the SRS on at least one additional SRS port of the UE in response to the cancellation indication.

14. The apparatus of claim 1, wherein the cancellation indication indicates the at least one code domain parameter for the SRS, wherein the at least one processor is further configured to cause the UE to:

transmit the SRS without the at least one code domain parameter indicated in the cancellation indication.

15. The apparatus of claim 14, wherein the at least one code domain parameter comprises a cyclic shift or a time domain orthogonal cover code (TD-OCC).

16. The apparatus of claim 15, wherein the uplink cancellation indication configuration is comprised in a radio resource control (RRC) configuration and includes at least one of a first set of one or more cyclic shift values or a second set of one or more TD-OCC sequences, wherein the cancellation indication indicates the at least one of the first set of one or more cyclic shift values or the second set of one or more TD-OCC sequences from the RRC configuration.

17. The apparatus of claim 1, wherein the cancellation indication is received in a group common downlink control information (GC-DCI).

18. An apparatus for wireless communication at a user equipment (UE), comprising:

at least one memory; and at least one processor coupled to the at least one memory and, based at least in part on information stored in the at least one memory, the at least one processor is configured to cause the UE to:

receive a configuration for a sounding reference signal (SRS);

receive an uplink cancellation indication configuration;

receive a cancellation indication indicating a periodicity for canceling the SRS at a plurality of transmission occasions; and skip transmission of the SRS based on the periodicity indicated in the cancellation indication.

19. The apparatus of claim 18, wherein the cancellation indication is received in a group common downlink control information (GC-DCI).

20. The apparatus of claim 18, wherein the UE further comprises at least one of a transceiver or an antenna coupled to the at least one processor, wherein the at least one processor is configured to receive the cancellation indication via at least one of the transceiver or the antenna, wherein the at least one processor is further configured to cause the UE to:

receive additional control signaling indicating for the UE to resume SRS transmissions at occasions of the plurality of transmission occasions canceled by the cancellation indication; and transmit the SRS transmissions in response to the additional control signaling.

21. An apparatus for wireless communication at a network node, comprising:

at least one memory; and at least one processor coupled to the at least one memory and, based at least in part on information stored in the at least one memory, the at least one processor is configured to cause the network node to:

configure a user equipment (UE) for a sounding reference signal (SRS);

configure an uplink cancellation indication configuration for the UE; and provide a cancellation indication canceling at least a portion of the SRS including one or more of:

time resources extending over one or more slots,
a subset of resource elements within a resource block, or
at least one code domain parameter of the SRS.

22. The apparatus of claim 21, wherein the cancellation indication cancels the SRS for a plurality of transmission occasions within a period of time spanning the one or more slots, wherein the at least one processor is configured to cause the network node to:

skip reception of the SRS within the time resources over the one or more slots.

23. The apparatus of claim 22, wherein the network node further comprises at least one of a transceiver or an antenna coupled to the at least one processor, wherein the at least one processor is configured to provide the cancellation indication via at least one of the transceiver or the antenna, wherein the at least one processor is configured to cause the network node to:

provide downlink control information (DCI) indicating to resume the SRS before an end of the one or more slots; and receive the SRS in response to the DCI.

24. The apparatus of claim 21, wherein the cancellation indication cancels the SRS on the subset of resource elements, wherein the at least one processor is configured to cause the network node to:

skip reception of the SRS on the subset of resource elements.

25. The apparatus of claim 21, wherein the cancellation indication indicates the at least one code domain parameter for the SRS, wherein the at least one processor is configured to cause the network node to:

receive the SRS without the at least one code domain parameter indicated in the cancellation indication.

26. The apparatus of claim 25, wherein the at least one code domain parameter comprises a cyclic shift or a time domain orthogonal cover code (TD-OCC).

27. The apparatus of claim 26, wherein the uplink cancellation indication configuration is comprised in a radio resource control (RRC) configuration and includes at least one of a first set of one or more cyclic shift values or a second set of one or more TD-OCC sequences, wherein the cancellation indication indicates the at least one of the first set of one or more cyclic shift values or the second set of one or more TD-OCC sequences from the RRC configuration.

28. The apparatus of claim 21, wherein the cancellation indication is comprised in a group common downlink control information (GC-DCI).

29. An apparatus for wireless communication at a network node, comprising:

at least one memory; and at least one processor coupled to the at least one memory and, based at least in part on information stored in the at least one memory, the at least one processor is configured to cause the network node to:

provide a configuration to a user equipment (UE) for a sounding reference signal (SRS);

configure an uplink cancellation indication configuration for the UE;

provide a cancellation indication indicating a periodicity for canceling the SRS at a plurality of transmission occasions; and skip reception of the SRS based on the periodicity indicated in the cancellation indication.

30. The apparatus of claim 29, wherein the network node further comprises at least one of a transceiver or an antenna coupled to the at least one processor, wherein the at least one processor is configured to provide the cancellation indication via at least one of the transceiver or the antenna, wherein the at least one processor is configured to cause the network node to:

provide additional control signaling indicating for the UE to resume SRS transmissions at occasions of the plurality of transmission occasions canceled by the cancellation indication; and receive the SRS transmissions in response to the additional control signaling.

* * * * *